United States Patent
Watazu

(10) Patent No.: US 11,960,692 B2
(45) Date of Patent: Apr. 16, 2024

(54) INFORMATION INPUT DEVICE CONFIGURED TO DETECT SHEAR FORCE

(71) Applicant: NISSHA CO., LTD., Kyoto (JP)

(72) Inventor: Yuji Watazu, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 22 days.

(21) Appl. No.: 17/904,563

(22) PCT Filed: Jan. 19, 2021

(86) PCT No.: PCT/JP2021/001589
§ 371 (c)(1),
(2) Date: Aug. 18, 2022

(87) PCT Pub. No.: WO2021/171834
PCT Pub. Date: Sep. 2, 2021

(65) Prior Publication Data
US 2023/0089017 A1    Mar. 23, 2023

(30) Foreign Application Priority Data

Feb. 25, 2020   (JP) .................................. 2020-029030

(51) Int. Cl.
*G06F 3/041* (2006.01)
*G06F 3/044* (2006.01)

(52) U.S. Cl.
CPC .......... *G06F 3/0448* (2019.05); *G06F 3/0412* (2013.01); *G06F 3/04164* (2019.05); *G06F 2203/04105* (2013.01)

(58) Field of Classification Search
None
See application file for complete search history.

(56) References Cited

U.S. PATENT DOCUMENTS

| | | |
|---|---|---|
| 9,336,969 B2 | 5/2016 | Takashima et al. |
| 2014/0174204 A1 | 6/2014 | Chen et al. |

(Continued)

FOREIGN PATENT DOCUMENTS

| | | |
|---|---|---|
| EP | 2416231 A1 | 2/2012 |
| JP | 2014202618 A | 10/2014 |

OTHER PUBLICATIONS

Nakai Y. et al., "Tangential Force Input for Touch Panel Using Shear Deformation of Gel Layer," IPSJ Interaction 2014, Feb. 27, 2014, 4 pages.

*Primary Examiner* — Brian M Butcher
(74) *Attorney, Agent, or Firm* — Alleman Hall & Tuttle LLP

(57) ABSTRACT

To provide an information input device excellent in durability and visibility and configured to detect a shear force, the information input device of the present invention includes a cover panel, a housing including a support portion that supports a peripheral edge of the cover panel from a back surface, a frame-shaped shear force sensor disposed between the peripheral edge of the cover panel and the support portion of the housing and detects a horizontal input with respect to a surface of the cover panel, and a detection circuit connected to the shear force sensor. The frame-shaped shear force sensor has a layered body including a band-like first electrode, an elastic member, and a pair of band-like second electrodes disposed so as to partially overlap with the first electrode.

16 Claims, 15 Drawing Sheets

(56) References Cited

U.S. PATENT DOCUMENTS

| | | |
|---|---|---|
| 2017/0045976 A1 | 2/2017 | Bushnell et al. |
| 2017/0082509 A1* | 3/2017 | Bushnell ............... G06F 1/1656 |
| 2017/0090618 A1* | 3/2017 | Qiao .................... G06F 1/1626 |
| 2018/0081400 A1 | 3/2018 | Pandya et al. |
| 2018/0356299 A1 | 12/2018 | Watazu et al. |

\* cited by examiner

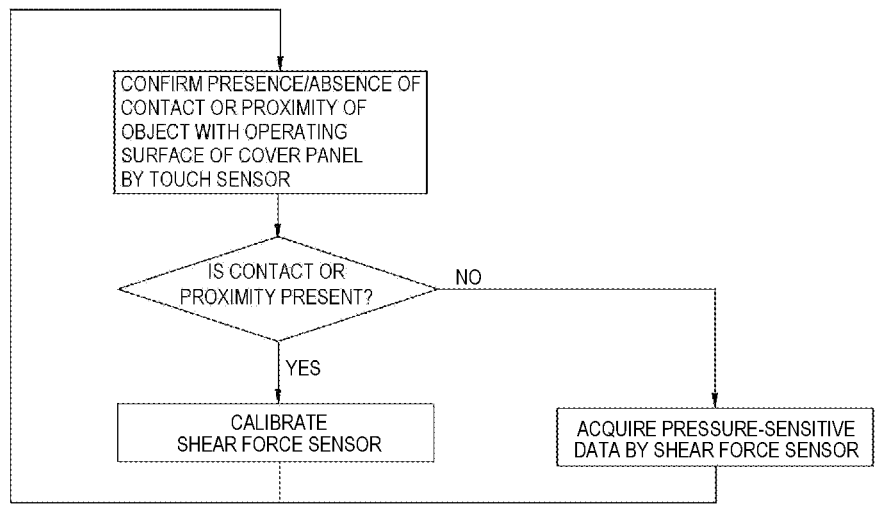
FIG. 28
FIG. 29(a)     FIG. 29(b)
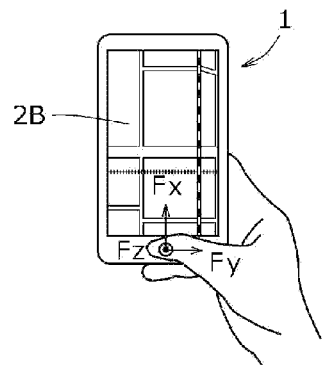 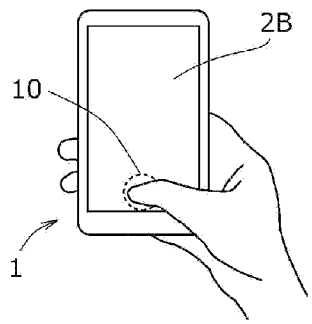
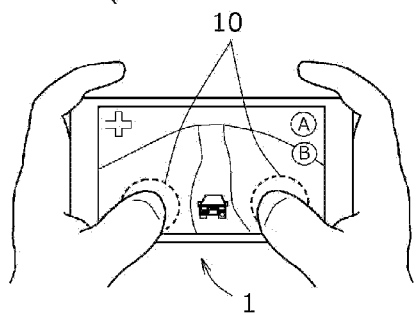
FIG. 29(c)

INFORMATION INPUT DEVICE CONFIGURED TO DETECT SHEAR FORCE

TECHNICAL FIELD

The present invention relates to an information input device that allows a user to input information through a press operation on a panel member and especially relates to an information input device configured to detect a shear force.

BACKGROUND ART

In many touch panels currently in widespread use, a capacitance method is used for detection of an input to ensure detection of coordinates of a finger at the time of input and measurement of a contact area. It is also known that a vertical force to a surface of the current touch panel is measured by the use of a change in contact area of the finger.

In recent years, it has been proposed to allow various operations by measuring a horizontal force to the surface of the current touch panel (see Non-Patent Literature 1).

The touch panel disclosed in Non-Patent Literature 1 has a structure in which a soft gel layer and a hard coat layer are layered in the order on a surface of the touch panel. The soft gel layer is a gel (KE-1052 (A/B), manufactured by Shin-Etsu Silicone) made of a transparent silicone resin having a thickness of approximately 1 mm, and is the hard coat layer (Digio2, manufactured by Nakabayashi) made of a transparent polyvinyl chloride sheet having a thickness of approximately 0.15 mm. The soft gel layer undergoes deformation due to an input of a force from the hard coat layer. Due to an incompressible property of the soft gel layer, the soft gel layer is not significantly displaced in the vertical direction despite its flexibility. On the other hand, the incompressibility of the material does not hinder the horizontal displacement. That is, the present structure has significant anisotropy of elasticity in which the structure is relatively hard in the vertical direction and permits large displacement in the horizontal direction. Therefore, simultaneously with acquisition of a change in coordinate in the horizontal direction of a finger while a user performs a push operation by the touch panel, a horizontal force F is detected by the Hooke's law (F=kx) based on the acquired displacement x of the finger and a spring constant k of a gel.

CITATION LIST

Non-Patent Literature

Non-Patent Literature 1: Yuriko Nakai, Shinya Kudo, Ryuta Okazaki, Hiroyuki Kajimoto, Hidenori Kuribayashi, "Tangential Force Input for Touch Panel Using Shear Deformation of Gel Layer," IPSJ Interaction 2014, p. 212 to 215

SUMMARY OF INVENTION

Technical Problem

However, in the touch panel disclosed in Non-Patent Literature 1, since the soft gel layer provided on the surface of the touch panel is a flexible material, durability against repeated inputs is poor.

Furthermore, since the soft gel layer and the hard coat layer are layered on the surface of the touch panel, optical characteristics are reduced by this layered body, and visibility of a touch panel screen is also poor.

Therefore, an object of the present invention to provide an information input device excellent in durability and visibility and configured to detect a shear force.

Solution to Problem

Some aspects will be described below as means to solve the problems. These aspects can be combined arbitrarily as necessary.

A characteristic configuration of an information input device according to the present invention includes a cover panel, a housing, a frame-shaped shear force sensor, and a detection circuit. The housing includes a support portion that supports a peripheral edge of the cover panel from a back surface. The shear force sensor is disposed between the peripheral edge of the cover panel and the support portion of the housing. The shear force sensor detects a horizontal input with respect to a surface of the cover panel. The detection circuit is connected to the shear force sensor.

According to this configuration, since the shear force sensor is disposed between the peripheral edge of the cover panel and the support portion of the housing and is protected by the cover panel, the shear force sensor is excellent in durability against repeated inputs.

In addition, since the shear force sensor has the frame shape, optical characteristics of a central display region do not decrease, and visibility of a touch panel screen is improved.

As one aspect, the frame-shaped shear force sensor preferably has a structure in which a first electrode member, an elastic member, and a second electrode member are layered in this order from a side of the cover panel.

Here, the first electrode member includes a first substrate, a band-like first electrode, and a first lead-out wiring line. The first substrate has at least a frame portion. The first electrode is disposed in a linear pattern on an opposed surface to the elastic member of the first substrate. The first lead-out wiring line is provided on the first substrate and connected to the first electrode.

The second electrode member includes a second substrate, a pair of band-like second electrodes, and a second lead-out wiring line. The second substrate has at least a frame portion. The second electrodes are disposed on an opposed surface to the elastic member of the second substrate so as to be in parallel to the first electrode and partially overlap with the first electrode in plan view. The second lead-out wiring line is disposed on the second substrate and connected to the second electrode.

The frame-shaped shear force sensor may have a structure in which arrangements of the first electrode member and the second electrode member are switched and the first electrode member and the second electrode member are layered.

With this configuration, even when the shear force sensor has the frame shape, measuring a change in capacitance between the electrodes allows detection of electrode movement in a horizontal direction due to deformation of the elastic member, thereby ensuring sufficient detection of a shear force.

In the configuration in which the frame-shaped shear force sensor described above includes the elastic member, as one aspect, each of the first substrate and the second substrate preferably includes a tongue piece portion that protrudes inward from an inner perimeter of the frame portion. The first lead-out wiring line and the second lead-out wiring line are preferably led to end portions of the tongue piece portions.

This configuration eliminates a need for a step of crimping a flexible printed circuit (FPC) separately and reduces the number of components. Furthermore, electrical reliability is improved.

In the configuration in which the frame-shaped shear force sensor described above includes the elastic member, when a substrate of the detection circuit is fixed to the side of the housing, the tongue piece portion of the electrode member located on a side of the cover panel among the first electrode member and the second electrode member is preferably deflected, and the tongue piece portion preferably has a distal end inserted into a connector provided on the substrate of the detection circuit.

Conversely, when a substrate of the detection circuit is fixed to the side of the cover panel, the tongue piece portion of the electrode member located on a side of the housing among the first electrode member and the second electrode member is preferably deflected, and the tongue piece portion preferably has a distal end inserted into a connector provided on the substrate of the detection circuit.

According to these configurations, even when a distance between a frame-shaped portion of the first electrode member or the second electrode member and the connector provided on the substrate of the detection circuit changes when a force is applied to the shear force sensor and the elastic member deforms in the horizontal direction, the change in distance can be absorbed by the deflected portion. Therefore, there is no possibility that displacement of the first electrode member or the second electrode member is hindered, or the tongue piece portion of the first electrode member or the second electrode member is damaged.

Note that when the information input device is, for example, a smartphone or a mobile game machine, the cover panel generally has a rectangular shape. Then, with the cover panel having the rectangular shape, the frame shape of the frame-shaped shear force sensor is also rectangular.

In the frame shape of the shear force sensor having the rectangular frame shape described above, as one aspect, the first electrode is preferably disposed on at least one side in the frame portion of the first substrate so as to run along the side. The pair of second electrodes are preferably disposed on a side opposed to the side on which the first electrode is disposed of the first electrode in the frame portion of the second substrate so as to run along the side. More preferably, one of the first electrodes is disposed on each of two parallel sides in the frame portion of the first substrate so as to run along the side. A set of the pair of second electrodes is disposed on each of two sides opposed to the two sides on which the first electrode is disposed of the first substrate in the frame portion of the second substrate so as to run along the side.

According to this configuration, a force in any of an X direction and a Y direction with respect to the cover panel and a force in a Z direction can be detected.

In the frame shape of the shear force sensor having the rectangular frame shape described above, as one aspect, one of the first electrodes may be disposed on each of four sides of the frame portion of the first substrate so as to run along the side. At this time, a set of the pair of the second electrodes are disposed on each of four sides of the frame portion of the second substrate so as to run along the side.

According to this configuration, the forces in the X direction, the Y direction, and the Z direction with respect to the cover panel can be detected.

In the frame shape of the shear force sensor having the rectangular frame shape described above, as one aspect, the first electrode is preferably disposed in a zigzag pattern formed from a plurality of linear portions on at least one side in the frame portion of the first substrate. The pairs of second electrodes are preferably disposed on a side opposed to the side on which the first electrode of the first substrate is disposed in the frame portion of the second substrate by a number of the linear portions in the zigzag pattern of the first electrode. More preferably, one of the first electrodes is disposed in a zigzag pattern formed from a plurality of linear portions on parallel two sides in the frame portion of the first substrate. The pairs of second electrodes are disposed on each of two sides opposed to the two sides on which the first electrode of the first substrate is disposed in the frame portion of the second substrate by a number of the linear portions in the zigzag pattern of the first electrode.

With this configuration, by simply providing a first electrode and second electrodes on only one side or only the two opposed sides, the forces in the X direction, the Y direction, and the Z direction with respect to a cover panel can be detected. The present embodiment is suitable for, for example, a smartphone because of the narrow frame edges of two sides.

In the frame shape of the shear force sensor having the rectangular frame shape described above, as one aspect, one of the first electrodes may be disposed on each of both sides excluding a central portion of parallel two sides in the frame portion of the first substrate so as to run along the side. At this time, two sets of the pair of second electrodes are disposed on each of two sides opposed to the two sides on which the first electrodes of the first substrate are disposed in the frame portion of the second electrode so as to run along the side.

According to this configuration, not only the shear force, but a force (moment) of rotating the cover panel can be detected from the shearing force.

In the configuration in which the frame-shaped shear force sensor described above includes the elastic member, as one aspect, the housing preferably includes a frame-shaped side wall portion. The side wall portion stands from the support portion so as to surround an end surface of the cover panel. The shear force sensor and an outer edge of the cover panel preferably maintain a distance from the side wall portion.

This is because, since the side wall portion protects the end surface of the cover panel in this configuration, when a finger touches the end surface of the cover panel, the finger is less likely to be injured and the cover panel is less likely to crack when the information input device falls. Additionally, by keeping the distance from the side wall portion, when the elastic member deforms in the horizontal direction, the end surface of the cover panel is prevented from being in contact with the side wall portion of the housing and damaged.

In a configuration in which the housing includes the side wall portion, as one aspect, a shock-absorbing member is preferably provided between the end surface of the cover panel and the side wall portion of the housing.

This configuration allows preventing, for example, dust from accumulating in the above-described clearance and diminishing an appearance.

At least a coefficient of friction of a region on which a shear force input is performed in an operating surface of the cover panel is preferably larger than a coefficient of friction of a region other than the region.

According to this configuration, a finger does not excessively slip on the operating surface, and the input by shear force is further easy.

In addition, an information input device in which a capacitive touch sensor is attached to a back surface center of the cover panel can be an object of the right of the present invention.

Advantageous Effects of Invention

The information input device according to the present invention is excellent in durability and visibility and configured to detect a shear force.

BRIEF DESCRIPTION OF DRAWINGS

FIG. 28 is a flowchart depicting calibration.

FIGS. 29(*a*)-(*c*) are diagrams is a diagram illustrating an example of an application achievable by the information input device of the present invention.

DESCRIPTION OF EMBODIMENTS

Embodiments of an information input device configured to detect a shear force will be described below with reference to the drawings.

Figure 1:
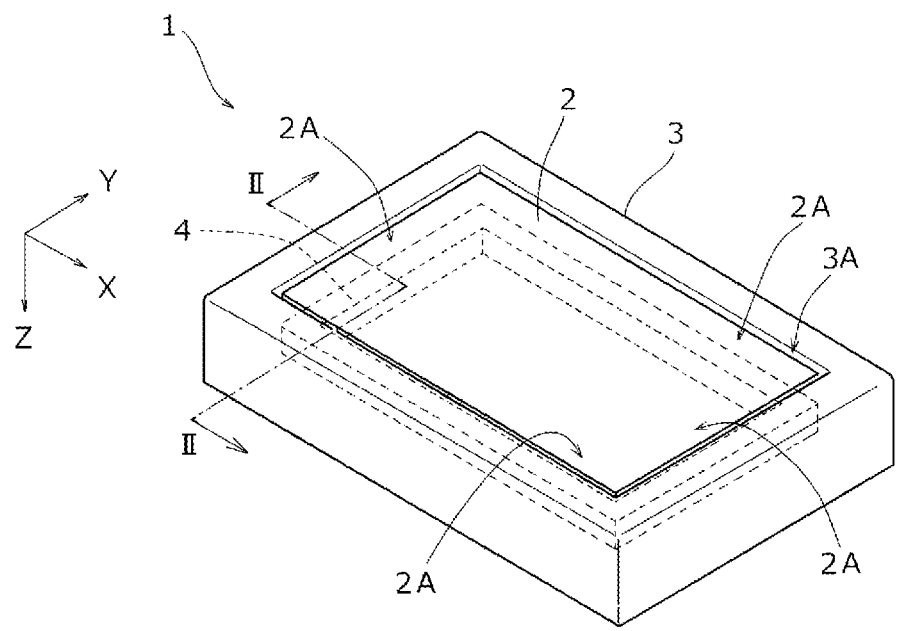
FIG. 1 is a perspective view of an information input device.
Figure 2:
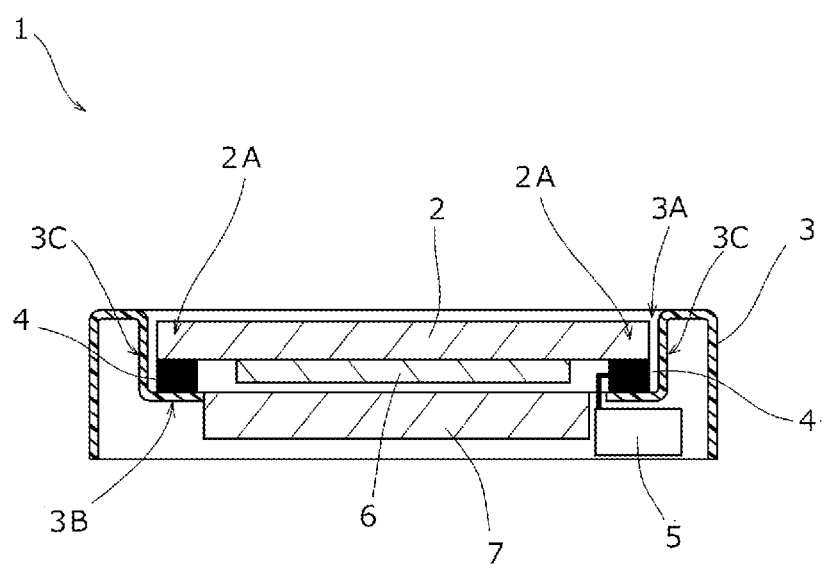
FIG. 2 is a cross-sectional view taken along II-II in FIG. 1.

First Embodiment of Information Input Device (1) Overall Configuration of Information Input Device First, the configuration of an information input device 1 on which a shear force sensor 4 is mounted will be described with reference to FIGS. 1 to 8. As illustrated in FIGS. 1 and 2, the information input device 1 includes a rectangular cover panel 2, a housing 3 including a support portion 3B that supports a peripheral edge 2A of the cover panel 2 from a back surface, and shear force detection means that includes a shear force sensor 4 disposed between the peripheral edge 2A of the cover panel 2 and the support portion 3B of the housing 3 and detecting a horizontal input with respect to a surface of the cover panel 2.

The cover panel 2 can be constituted by a glass plate using, for example, a soda glass and a tempered glass, and is a thin glass plate in the present embodiment. In addition to this, for example, a resin material, such as polymethyl methacrylate or polycarbonate, and an organic inorganic hybrid material may be used to constitute the cover panel 2.

In addition, for example, the use of a cover panel having a so-called touch input function that detects an X-Y coordinate as an operation position based on a touch operation on the cover panel 2 by a user as the cover panel 2 allows both of detection of a pressure and detection of the X-Y coordinate, and a convenience of the device is increased. The cover panel having the touch input function is selectable from, for example, a resistive film method, a capacitance method, and an electromagnetic induction method. In the present embodiment, as illustrated in FIG. 2, a capacitive touch sensor 6 is attached to the back surface center of the cover panel 2, thereby imparting the touch input function.

As illustrated in FIG. 2, the shear force detection means includes the shear force sensor 4 provided to be interposed between the peripheral edge 2A of the cover panel 2 and the support portion 3B, which supports the cover panel 2, of the housing 3, and a detection circuit 5, such as a signal processing circuit, that processes an output signal from the shear force sensor 4.

As illustrated in FIGS. 1 and 2, the housing 3 further includes a frame-shaped side wall portion 3C that stands from the support portion 3B so as to surround the end surface of the cover panel 2. That is, a space surrounded by the side wall portion 3C of the housing 3 is a housing portion 3A of the cover panel 2 and the shear force sensor 4.

The known resin and metal can be used as the material of the housing 3.

(2) Basic Structure of Shear Force Sensor

Figure 3:
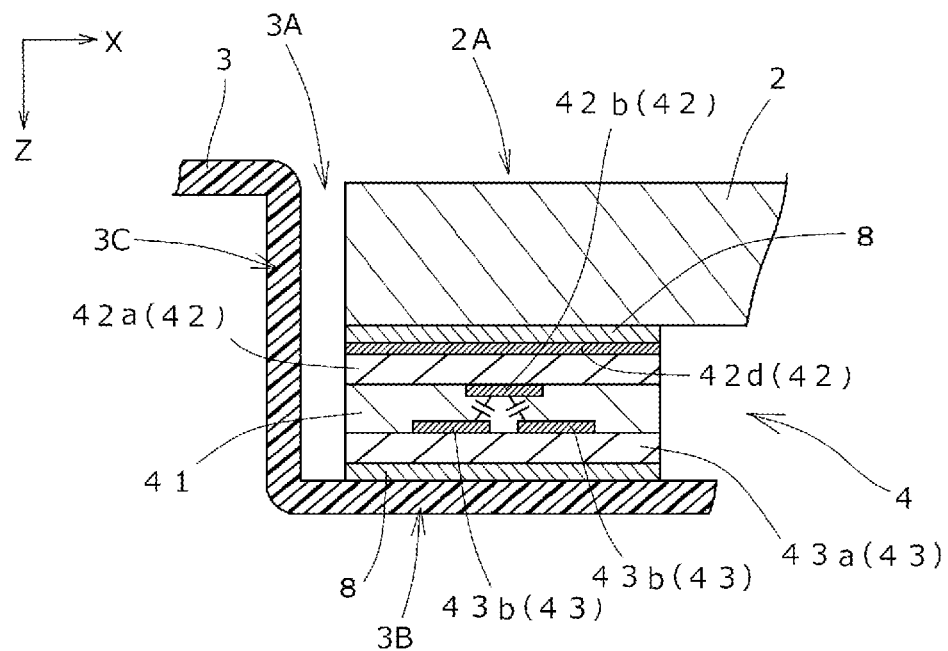
FIG. 3 is an enlarged view in the vicinity of a shear force sensor in FIG. 2.
Figure 4:
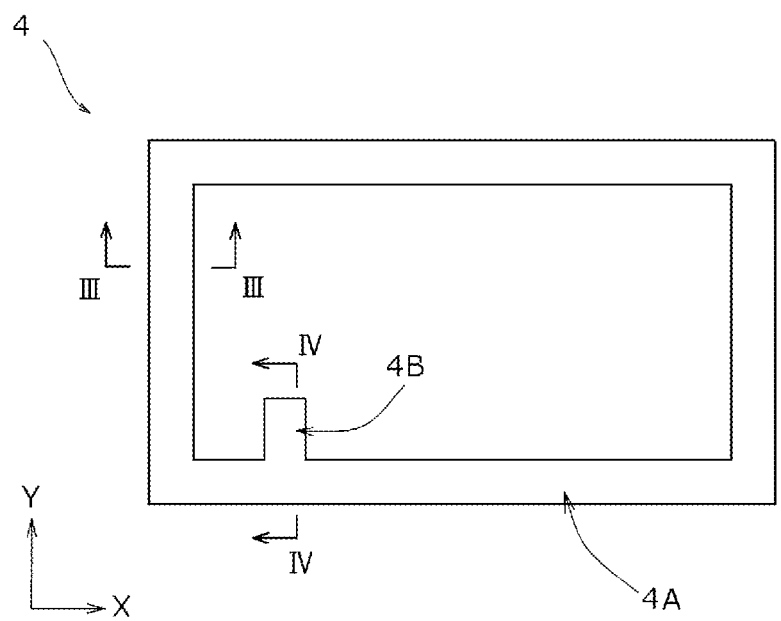
FIG. 4 is a plan view of a shear force sensor according to first and second embodiments.
Figure 5:
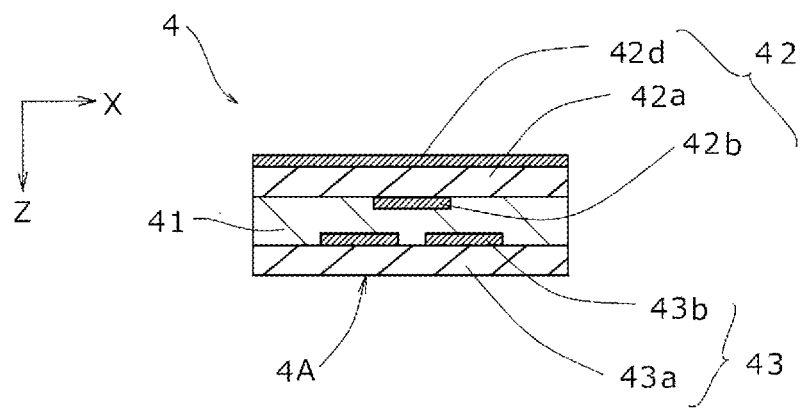
FIG. 5 is a cross-sectional view taken along in FIG. 4 in the first embodiment.
Figure 6:
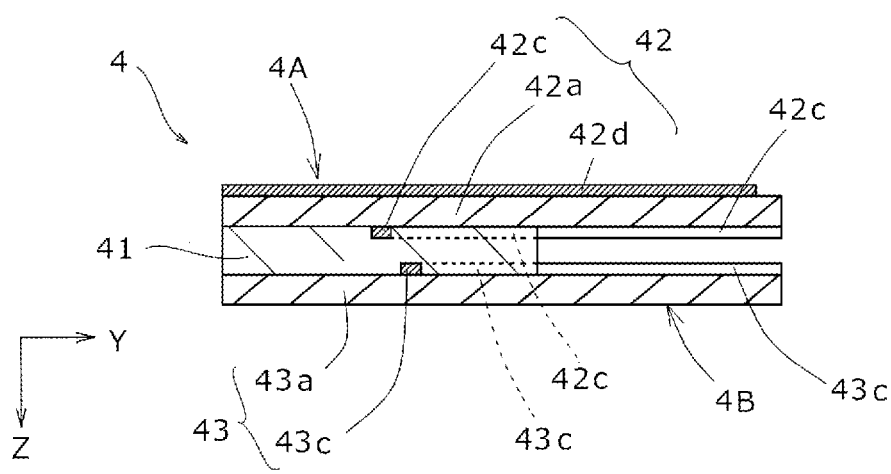
FIG. 6 is a cross-sectional view taken along IV-IV in FIG. 4 in the first embodiment.
Figure 7:
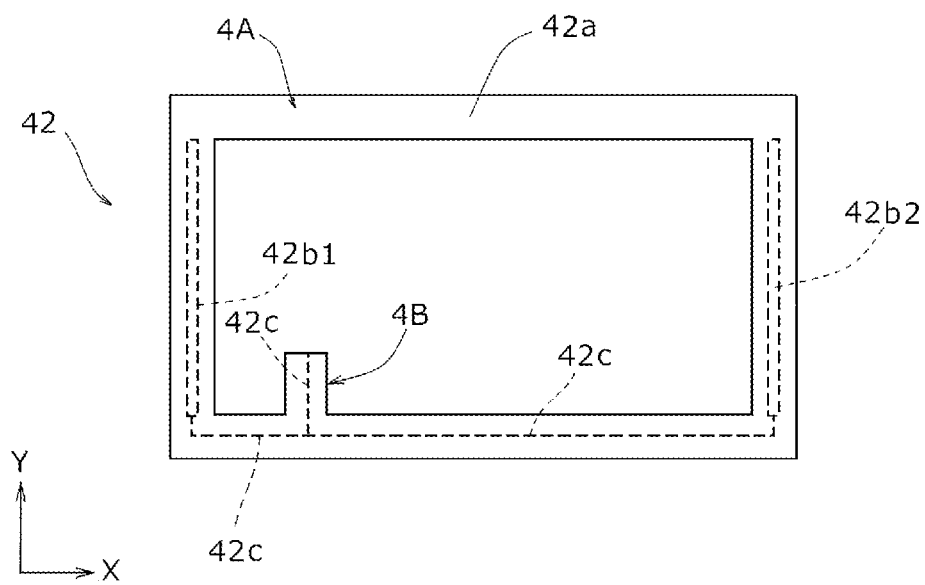
FIG. 7 is a plan view illustrating a first electrode member of the shear force sensor according to the first embodiment.
Figure 8:
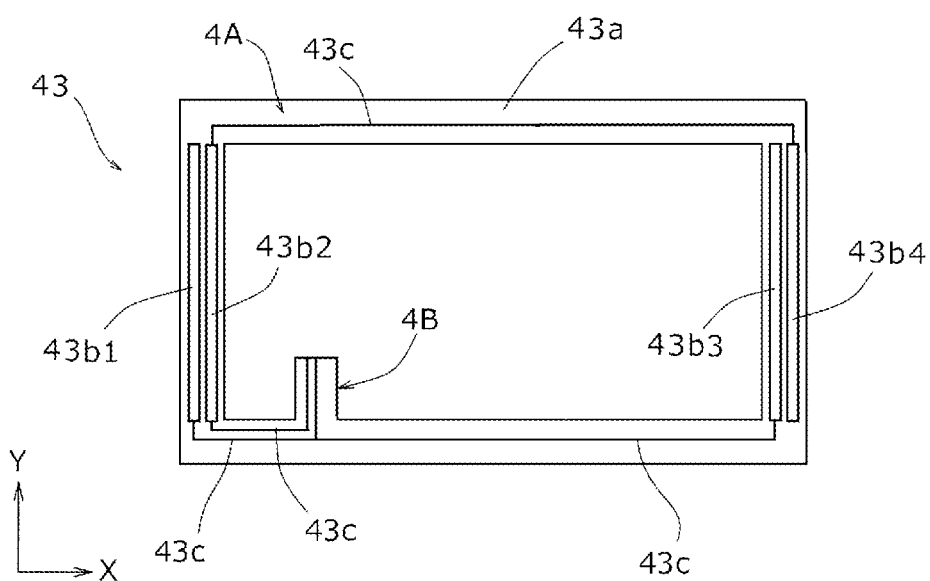
FIG. 8 is a plan view illustrating a second electrode member of the shear force sensor according to the first embodiment.

The configuration of the shear force sensor 4 will be described below. FIG. 3 is an enlarged view in the vicinity of a shear force sensor in FIG. 2. FIG. 4 is a plan view of a shear force sensor according to first and second embodiments. FIG. 5 is a cross-sectional view taken along in FIG. 4 in the first embodiment. FIG. 6 is a cross-sectional view taken along IV-IV in FIG. 4 in the first embodiment. FIG. 7 is a plan view illustrating a first electrode member of the shear force sensor according to the first embodiment. FIG. 8 is a plan view illustrating a second electrode member of the shear force sensor according to the first embodiment.

As illustrated in FIGS. 3 to 8, the shear force sensor 4 used in the information input device 1 has a frame shape and has a structure layered in the order of a first electrode member 42, an elastic member 41, and a second electrode member 43 from the side of the cover panel 2. The outer diameters of the frame-shaped first electrode member 42, elastic member 41, and cover panel 2 are matched with the dimension of the housing portion 3A of the housing 3 in consideration of deformation in the horizontal direction of the elastic member 41. In other words, these outer edges keep a distance from the side wall portion 3C of the housing 3. Also, the inner perimeters of the frame-shaped first electrode member 42, elastic member 41, and second electrode member 43 are adjusted so as to be larger than the touch sensor 6 provided on the back surface of the cover panel 2.

The first electrode member 42 includes a first substrate 42$a$, a band-like first electrode 42$b$, and a GND layer 42$d$ (see FIGS. 5 and 7).

The first substrate 42$a$ includes a frame portion 4A having a rectangular shape and a tongue piece portion 4B projecting inward from the inner perimeter at one long side of the frame portion 4A.

The first electrode 42$b$ is a band-like electrode. One first electrode 42$b$ is disposed in a linear pattern on each of the short sides of the opposed surface to the elastic member 41 of the first substrate 42$a$ so as to run along the short side of the first substrate 42$a$, specifically as a first electrode 42$b$1 and a first electrode 42$b$2.

The GND layer 42$d$ is disposed on a surface opposite to the side of the elastic member 41 of the first substrate 42$a$.

Note that, as illustrated in FIGS. 6 and 7, the first electrode 42$b$1 and the first electrode 42$b$2 are connected with a first lead-out wiring line 42$c$ at one ends on the side of the long side including the tongue piece portion 4B. Furthermore, the first lead-out wiring line 42$c$ is branched and finally led to the end portion of the tongue piece portion 4B.

The second electrode member 43 includes a second substrate 43$a$ and second electrodes 43$b$ (see FIGS. 5 and 8).

The second substrate 43$a$ is a base material having the same shape and the same dimension as those of the first substrate 42$a$.

Each of the second electrodes 43$b$ is a band-like electrode, and the two apposed second electrodes 43$b$ are paired. One set of the pair of second electrodes 43$b$, 43$b$ are disposed on each of the short sides of the opposed surface to the elastic member 41 of the second substrate 43$a$ so as to be parallel to the first electrodes 42$b$ and partially overlap with the first electrodes 42$b$ in plan view.

Specifically, a set of a second electrode 43$b$1 and a second electrode 43$b$2 and a set of a second electrode 43$b$3 and a second electrode 43$b$4 are disposed.

The GND layer 42$d$ of the first electrode member 42 is provided as a measure against noise, but can be omitted. When the GND layer 42$d$ of the first electrode member 42 is provided, it is preferable that the GND layer 42$d$ is formed solid in a region at least covering the second electrode 43$b$ of the second electrode member 43 and the first electrode 42$b$ of the first electrode member 42 in plan view.

Note that, as illustrated in FIGS. 6 and 8, the second electrode 43$b$1 and the second electrode 43$b$3 provided on the short sides different from one another are connected with a second lead-out wiring line 43$c$ at one ends on the side of the long side including the tongue piece portion 4B. Furthermore, the second lead-out wiring line 43$c$ connecting the second electrode 43$b$1 and the second electrode 43$b$3 is branched and finally led to the end portion of the tongue piece portion 4B.

Similarly, the second electrode 43$b$2 and the second electrode 43$b$4 provided on the short sides different from one another are connected with the second lead-out wiring line 43$c$ at one end on the side of the long side not including the tongue piece portion 4B. Furthermore, the second lead-out wiring line 43$c$ is also connected to the other end of the second electrode 43$b$2, and finally is led to the end portion of the tongue piece portion 4B.

Further, the GND layer 42$d$ of the first electrode member 42 described above is more preferably formed solid in a region covering the second lead-out wiring line 43$c$ of the second electrode member 43 and the first lead-out wiring line 42$c$ of the first electrode member 42 in plan view excluding the end portion of the tongue piece portion 4B inserted into a connector 52. In the illustrated example, the GND layer 42$d$ is solid in the entire surface of the tongue piece portion 4B excluding the end portion and the entire surface of the frame portion 4A.

The elastic member 41 is interposed between the first electrode member 42 and the second electrode member 43 to be integrated with them, and deforms by a force input in a vertical direction or a horizontal direction with respect to the surface of the cover panel 2. Note that the elastic member 41 includes only the frame portion 4A, and does not include the tongue piece portion 4B as illustrated in FIG. 6.

As illustrated in FIG. 3, a frame-shaped adhesive member 8 is disposed in each of between the shear force sensor 4 and the cover panel 2 and between the shear force sensor 4 and the support portion 3B of the housing 3.

According to the present embodiment, forces in an X direction and a Z direction with respect to the cover panel 2 can be detected.

Figure 9:
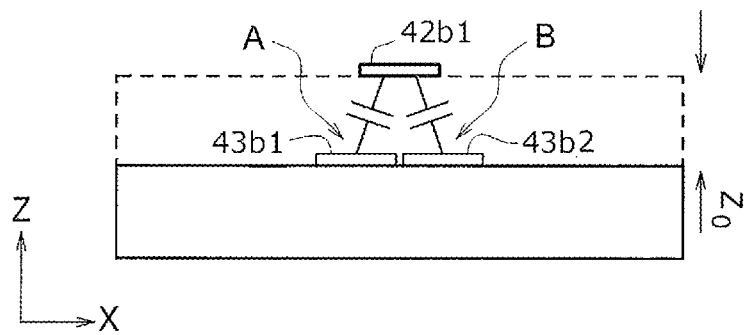
FIG. 9 is a schematic cross-sectional view illustrating a relationship between a mutual capacitance, a shear force, and a force in a normal direction.
Figure 10:
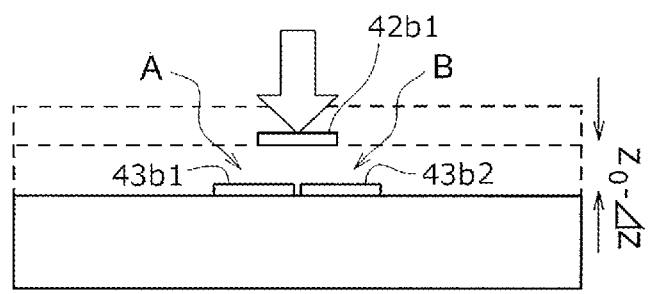
FIG. 10 is a schematic cross-sectional view illustrating a relationship between a mutual capacitance, a shear force, and a force in a normal direction.
Figure 11:
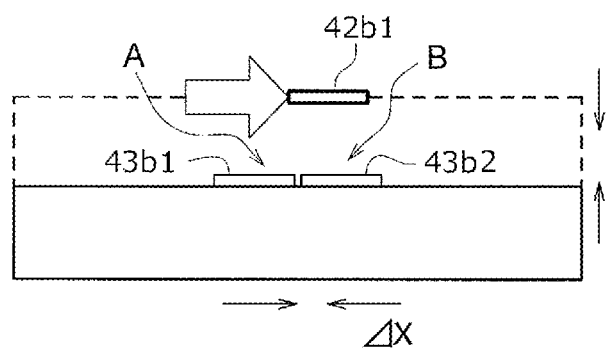
FIG. 11 is a schematic cross-sectional view illustrating a relationship between a mutual capacitance, a shear force, and a force in a normal direction.

(3) Relationship Between Mutual Capacitance, Shear Force, and Force in Normal Direction The relationship between the mutual capacitance, the shear force, and further the force in the normal direction (Z direction) of the first electrode 42b and the pair of second electrodes 43b, 43b will be described below. Since the X direction is considered here, FIGS. 9 to 11 illustrate the positional relationship between the first electrode 42b1 and the pair of second electrodes 43b1, 43b2 as cross-sectional views. FIGS. 9 to 11 are schematic cross-sectional views illustrating a relationship between the mutual capacitance, the shear force, and the force in a normal direction.

FIG. 9 illustrates a situation where no force is applied to the shear force sensor 4 via the cover panel 2. In this situation, a distance in the normal direction of the planes between the first electrode 42b1 and the second electrode 43b1, 43b2 is denoted as $z_0$.

As illustrated in FIG. 10, when the shear force sensor 4 is pressed in the —Z direction via the cover panel 2, the first electrode 42b1 approaches the second electrodes 43b1, 43b2 in accordance with the strength of pressure. That is, the distance becomes $z_0$-$\Delta z$ from $z_0$. In this case, as the distance becomes close, a charge accumulated between the electrodes increases, and therefore a mutual capacitance $C_1$ of an overlap A and a mutual capacitance $C_2$ of an overlap B both increase in accordance with $\Delta z$.

When the deformation of the elastic member 41 is an elastic region, $\Delta z$ is proportional to a force Fz, so the relationship between the force Fz and the mutual capacitances $C_1$ and $C_2$ is generally represented by Formula 1 below.

Here, $C_1^0$ and $C_2^0$ in the formula are values of $C_1$ and $C_2$ in a no-load state, respectively, and are values measured and stored during calibration.

Therefore, the force $F_z$ in the –Z direction can be detected by the change in capacitance when the shear force sensor 4 is pressed in the –Z direction via the cover panel 2.

$$F_x \propto \frac{C_1}{C_1 + C_2} - \frac{C_1^0}{C_1^0 + C_2^0} \quad \text{Formula 1}$$

Meanwhile, as illustrated in FIG. 11, a case where a pressing force (shear force) occurs in the +X direction by the shear force sensor 4 via the cover panel 2 is considered. In that case, the first electrode 42b1 moves in accordance with the strength of pressure. In this case, the mutual capacitance $C_1$ of the overlap A and the mutual capacitance $C_2$ of the overlap B change in accordance with $\Delta x$. That is, the capacitance between the first electrode 42b1 and the second electrode 43b2 increases, and the capacitance between the first electrode 42b1 and the other second electrode 43b1 decreases.

When the deformation of the elastic member 41 is the elastic region, since $\Delta x$ is proportional to the force $F_x$, the relationship between the force $F_x$ and the mutual capacitances $C_1$ and $C_2$ is generally represented by Formula 2 below.

Therefore, the force $F_x$ in the +X direction can be detected by the change in capacitance when the shear force sensor 4 is pressed in the +X direction via the cover panel 2.

$$F_z \propto \frac{C_1 + C_2}{C_1^0 + C_2^0} - 1 \quad \text{Formula 2}$$

While the description above is about the first electrode 42b1 and the pair of second electrodes 43b1, 43b2, the same applies to the first electrode 42b2 and the pair of second electrodes 43b3, 43b4 provided on the opposed side.

Note that in the present invention, the first electrode 42b1 and the pair of second electrodes 43b1, 43b2 may be provided only on one side (not illustrated). However, in this embodiment, the first electrode 42b2 and the pair of second electrodes 43b3, 43b4 are also provided on the opposed side. Thus, a shear force can be detected more accurately. For example, in a case where a shear input is performed by a finger at one point of an end in an operating surface of the cover panel 2, the cover panel 2 rotates and moves around an axis perpendicular to the plate surface, and a detection error occurs in the case of the electrodes on only one side. In contrast, when the electrodes are present on the opposed sides, the detection error can be canceled.

(4) Each Member of Shear Force Sensor

The first substrate 42a and the second substrate 43a are, for example, films, and the material can include a material usable for a flexible substrate, for example, general-purpose resins, such as polyethylene terephthalates, polystyrene resins, polyolefin resins, ABS resins, AS resins, acrylic resins, and AN resins. General purpose engineering resins, such as polystyrene resins, polycarbonate resins, polyacetal resins, polycarbonate-modified polyphenylene ether resins, polybutylene terephthalate resins, and ultra-high-molecular-weight polyethylene resins, and super engineering resins, such as polysulfone resins, polyphenylene sulfide resins, polyphenylene oxide resins, polyarylate resins, polyether imide resins, polyimide resins, liquid crystal polyester resins, and polyallyl heat-resistant resins can be used.

As the materials of the first electrode 42b and the second electrode 43b, a metal, such as gold, silver, copper, or nickel, or a paste having conductivity, such as carbon, can be used. Examples of the formation method include various types of printing methods, such as screen printing. Further, the first electrode 42b and the second electrode 43b can also be formed by sticking a metal foil, such as copper or gold, and performing an etching process on the metal foil of the portion not protected by a resist.

Various elastomers, such as silicone elastomers and urethane elastomers, or gel-like materials and foams thereof are used as the elastic member 41. The thickness of the elastic member 41 is preferably from 0.1 mm to 1 mm. More preferably, the thickness is from 0.1 mm to 0.2 mm.

For example, an adhesive, such as a glue, and an adhesive layer, such as a double-sided adhesive tape, is used as the adhesive member 8.

Second Embodiment

In the first embodiment, the first electrodes 42b and the second electrodes 43b are disposed only in the short sides, but the shear force sensor 4 used in the present invention is not limited thereto. For example, the first electrodes 42b and the second electrodes 43b may be disposed not only on the short sides but also on the long sides.

Figure 14:
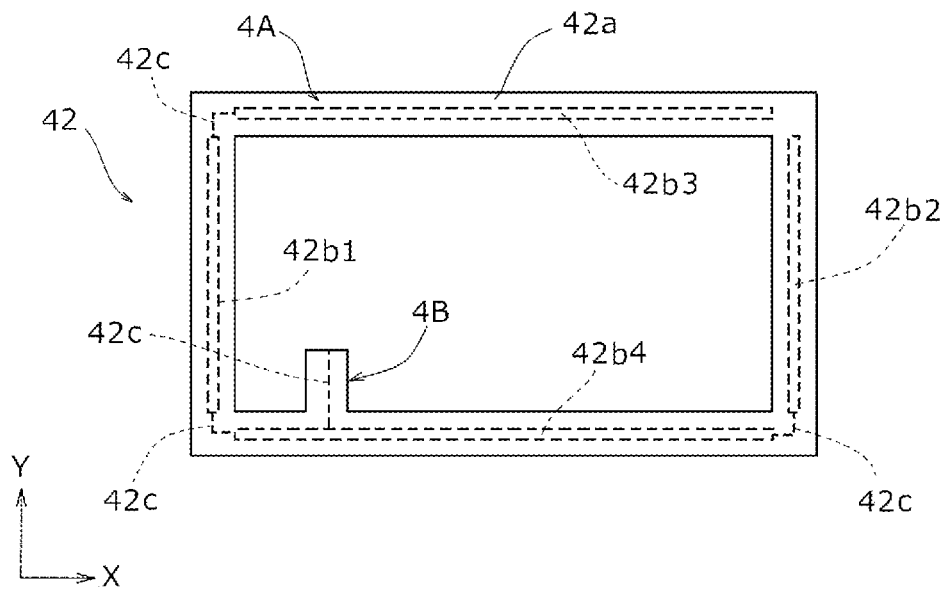
FIG. 14 is a plan view illustrating a first electrode member of a shear force sensor according to the second embodiment.
Figure 15:
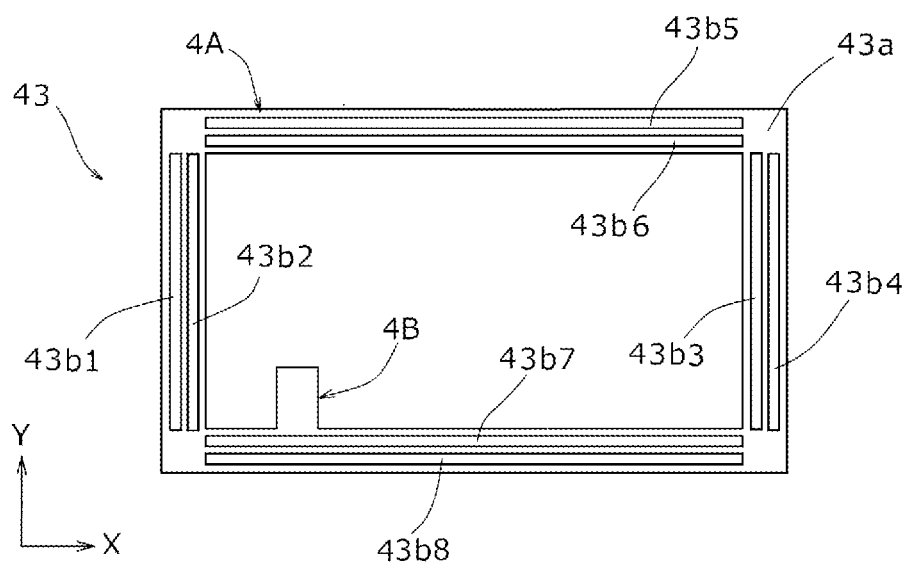
FIG. 15 is a plan view illustrating a second electrode member of the shear force sensor according to the second embodiment.
Figure 16:
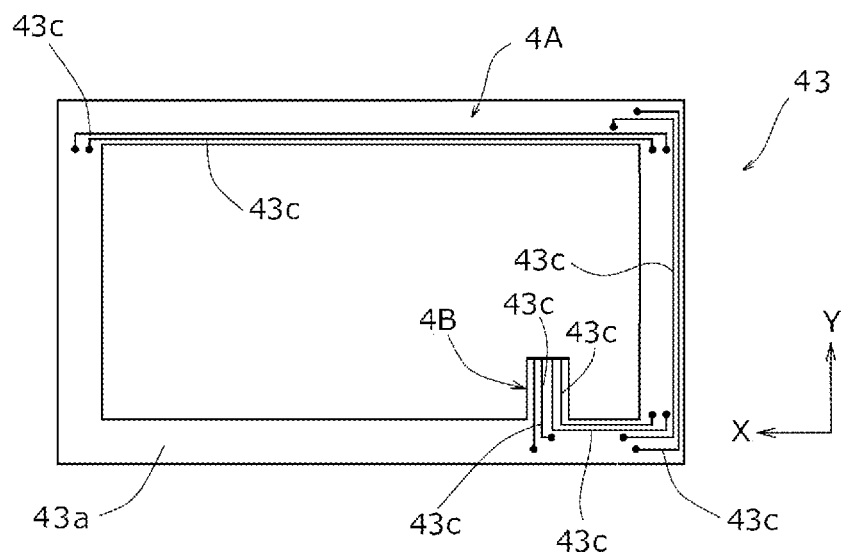
FIG. 16 is a rear view illustrating the second electrode member of the shear force sensor according to the second embodiment.

FIG. 14 is a plan view illustrating a first electrode member of a shear force sensor according to the second embodiment. FIG. 15 is a plan view illustrating a second electrode member of the shear force sensor according to the second embodiment. FIG. 16 is a rear view illustrating the second electrode member of the shear force sensor according to the second embodiment.

In the present embodiment, as illustrated in FIG. 14, in the first electrode member 42, one first electrode 42b is disposed in a linear pattern on each of the four sides of the opposed surface to the elastic member 41 of the first substrate 42a so as to run along the four sides of the first substrate 42a, specifically as the first electrode 42b1, the first electrode 42b2, a first electrode 42b3, and a first electrode 42b4.

Additionally, as illustrated in FIG. 15, in the second electrode member 43, one set of the pair of second electrodes 43b, 43b are disposed on each of the four sides of the opposed surface to the elastic member 41 of the second substrate 43a so as to be parallel to the first electrode 42b and partially overlap with the first electrode 42b in plan view.

Specifically, the set of the second electrode 43b1 and the second electrode 43b2, the set of the second electrode 43b3 and the second electrode 43b4, a set of two electrodes 43b5 and a second electrode 43b6, and a set of a second electrode 43b7 and a second electrode 43b8 are disposed.

Note that, as illustrated in FIG. 14, in the first electrode member 42, the first electrodes 42b1 to 42b4 are connected with the first lead-out wiring line 42c at three corners. Furthermore, the first lead-out wiring line 42c is led from the first electrode 42b4 disposed on the side including the tongue piece portion 4B to the end portion of the tongue piece portion 4B.

Figure 12:
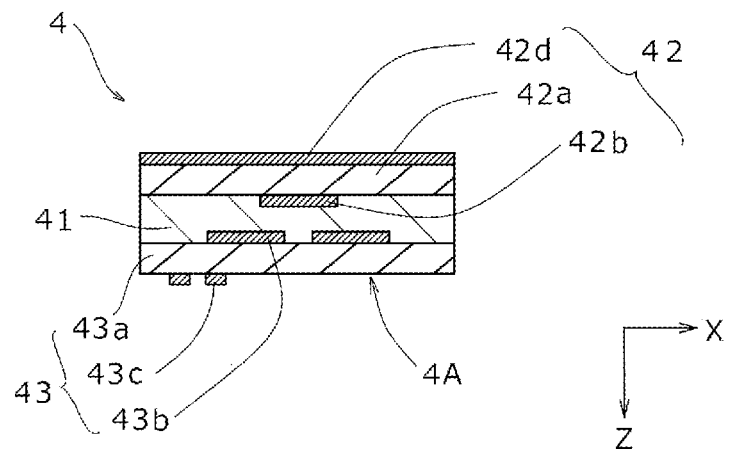
FIG. 12 is a cross-sectional view taken along in FIG. 4 in the second embodiment.

On the other hand, as illustrated in FIGS. 12, 15, and 16, in the second electrode member 43, the second electrode 43b1 and the second electrode 43b4 provided on short sides different from one another are connected at one end on the side of the long side not including the tongue piece portion 4B with the second lead-out wiring line 43c led to the surface not opposed to the elastic member 41 via a through hole. Further, the second lead-out wiring line 43c is also connected to the other end of the second electrode 43b1 via a through hole, and the second lead-out wiring line 43c is led on the surface not opposed to the elastic member 41 to the end portion of the tongue piece portion 4B.

Similarly, the second electrode 43b2 and the second electrode 43b3 provided on short sides different from one another are connected at one end on the side of the long side not including the tongue piece portion 4B with the second lead-out wiring line 43c led to the surface not opposed to the elastic member 41 via a through hole (not illustrated). Further, the second lead-out wiring line 43c is also connected to the other end of the second electrode 43b2 via a through hole (not illustrated), and the second lead-out wiring line 43c is led on the surface not opposed to the elastic member 41 to the end portion of the tongue piece portion 4B.

Figure 13:
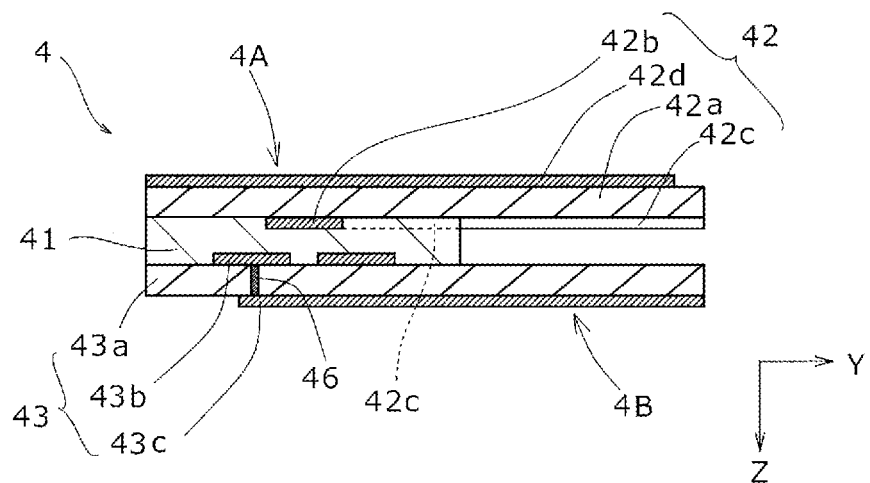
FIG. 13 is a cross-sectional view taken along IV-IV in FIG. 4 in the second embodiment.

As illustrated in FIGS. 13, 15, and 16, the second electrode 43b5 and the second electrode 43b8 provided on long sides different from one another are connected at one end on the side of the same short side with the second lead-out wiring line 43c led to the surface not opposed to the elastic member 41 via a through hole (not illustrated). Further, the second lead-out wiring line 43c is also connected to the second electrode 43b8 disposed on the side including the tongue piece portion 4B via a through hole 46, and the second lead-out wiring line 43c is led on the surface not opposed to the elastic member 41 to the end portion of the tongue piece portion 4B.

Similarly, the second electrode 43b6 and the second electrode 43b7 provided on long sides different from one another are connected at one end on the side of the same short side with the second lead-out wiring line 43c led to the surface not opposed to the elastic member 41 via a through hole. Further, the second lead-out wiring line 43c is also connected to the second electrode 43b7 disposed on the side including the tongue piece portion 4B via a through hole, and the second lead-out wiring line 43c is led on the surface not opposed to the elastic member 41 to the end portion of the tongue piece portion 4B.

FIG. 12 is a cross-sectional view taken along in FIG. 4 in the second embodiment. FIG. 13 is a cross-sectional view taken along IV-IV in FIG. 4 in the second embodiment.

The other points of this embodiment are similar to the first embodiment described above.

According to the present embodiment, three component forces (forces in the X direction, the Y direction, and the Z direction) with respect to the cover panel 2 can be detected.

When detecting the three component forces with respect to the cover panel 2 in the present invention, it is sufficient to simply provide one electrode on each of the short side and the long side (not illustrated), but in the present embodiment, the electrodes are further provided on the opposed short side and the long side, thereby ensuring further accurately detecting the shear force. As described above, the cover panel 2 rotates and moves around the axis perpendicular to the plate surface, and a detection error occurs in the case of only one electrode on each of the short side and the long side. In contrast, when the electrodes are present on the opposed sides, the detection error can be canceled.

Third Embodiment

In addition, in the second embodiment, the first electrodes 42b and the second electrodes 43b are provided on all sides, and thus the three component forces with respect to the cover panel 2 are detected, but the three component forces may be detected by another configuration.

Figure 17:
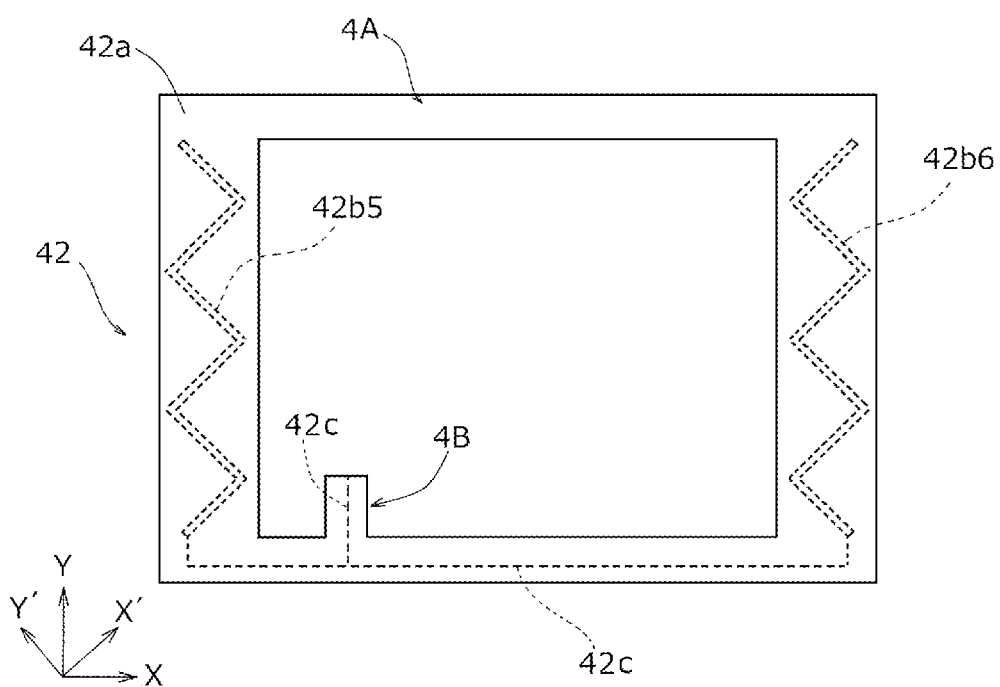
FIG. 17 is a plan view illustrating a first electrode member of a shear force sensor according to a third embodiment.
Figure 18:
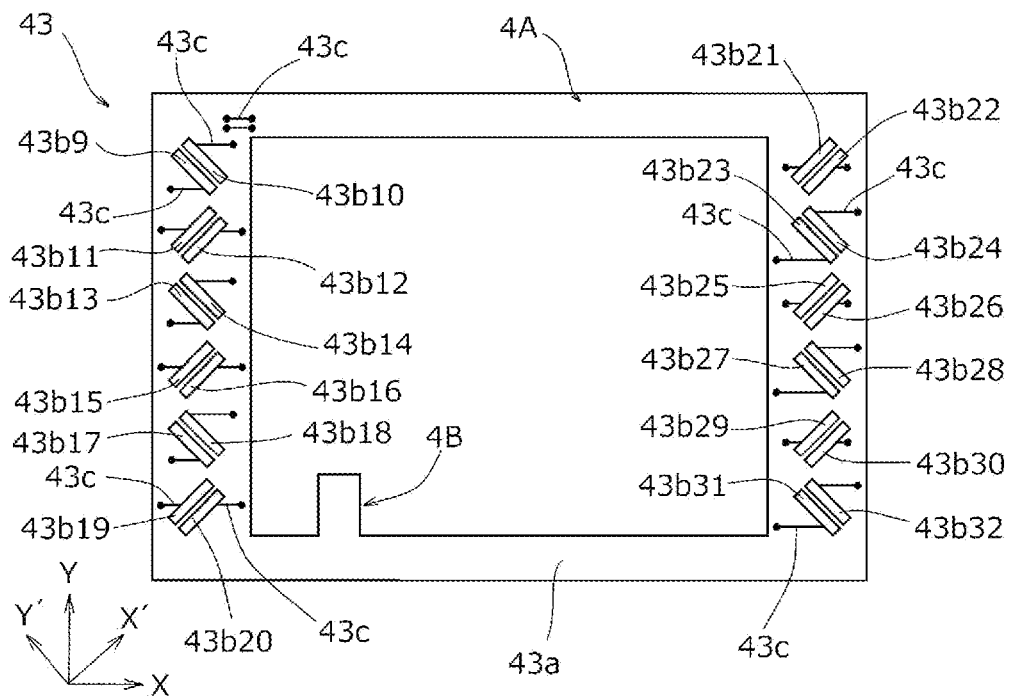
FIG. 18 is a plan view illustrating a second electrode member of the shear force sensor according to the third embodiment.
Figure 19:
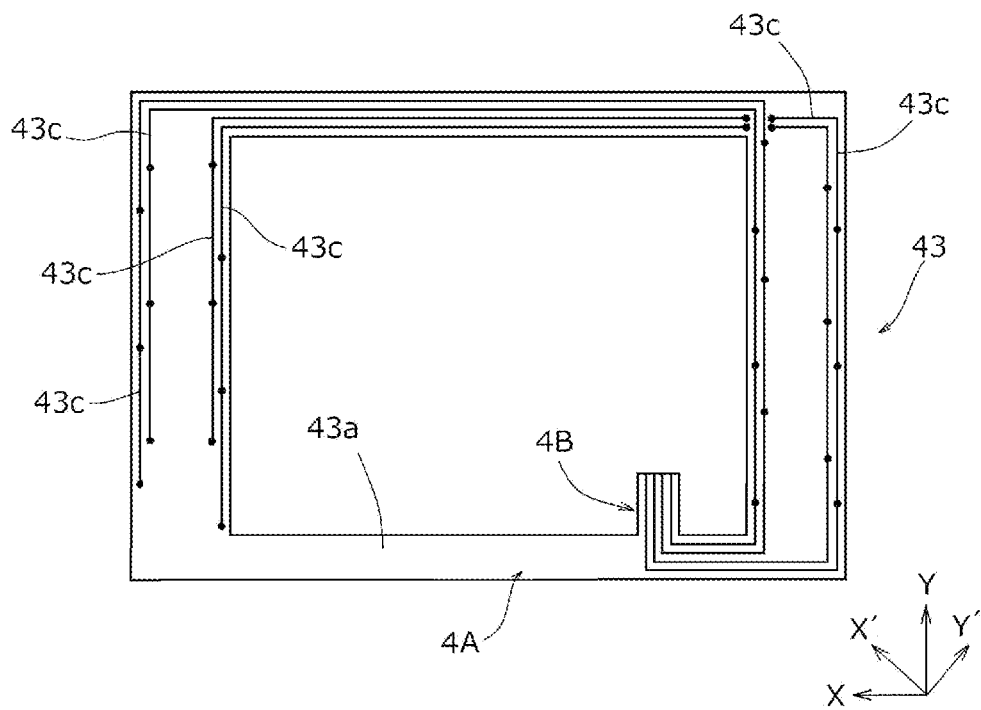
FIG. 19 is a rear view illustrating the second electrode member of the shear force sensor according to the third embodiment.

FIG. 17 is a plan view illustrating a first electrode member of a shear force sensor according to a third embodiment. FIG. 18 is a plan view illustrating a second electrode member of the shear force sensor according to the third embodiment. FIG. 19 is a rear view illustrating the second electrode member of the shear force sensor according to the third embodiment.

In the present embodiment, as illustrated in FIG. 17, in the first electrode member 42, one first electrode 42b is disposed on each of short sides of the opposed surface to the elastic member 41 of the first substrate 42a in a pattern (so-called zigzag pattern) in which straight lines are bent many times in a Z shape, specifically as a first electrode 42b5 and a first electrode 42b6. FIG. 17 illustrates an example in which the zigzag pattern has three peaks and three troughs, and the linear portions at the six locations of each zigzag pattern are inclined (an X' direction and a Y' direction in the drawing) with respect to the four sides (X-Y direction) of the first substrate 42a at an angle of 45°.

Note that the linear portions are not limited to the illustrated example, and the linear portions in the zigzag pattern may be more than or less than six locations.

Additionally, as illustrated in FIG. 18, in the second electrode member 43, six sets of the pair of second electrodes 43b, 43b inclined in the X-Y direction are disposed on each of the short sides of the opposed surface with the elastic member 41 of the second substrate 43a so as to be parallel to the linear portions at the six locations in the zigzag pattern of the first electrodes 42b and partially overlap with the first electrode 42b in plan view.

Specifically, on the first electrode 42b5, from the side of the long side not including the tongue piece portion 4B, a set of a second electrode 43b9 and a second electrode 43b10 inclined in the Y' direction, a set of a second electrode 43b11 and a second electrode 43b12 inclined in the X' direction, a set of a second electrode 43b13 and a second electrode 43b14 inclined in the Y' direction, a set of a second electrode 43b15 and a second electrode 43b16 inclined in the X' direction, a set of a second electrode 43b17 and a second electrode 43b18 inclined in the Y' direction, and a set of a second electrode 43b19 and a second electrode 43b20 inclined in the X' direction are sequentially disposed.

On the other hand, on the first electrode 42b6, from the side of the long side not including the tongue piece portion 4B, a set of a second electrode 43b21 and a second electrode 43b22 inclined in the X' direction, a set of a second electrode 43b23 and a second electrode 43b24 inclined in the Y' direction, a set of a second electrode 43b25 and a second electrode 43b26 inclined in the X' direction, a set of a second electrode 43b27 and a second electrode 43b28 inclined in the Y' direction, a set of a second electrode 43b29 and a second electrode 43b30 inclined in the X' direction, and a set of a second electrode 43b31 and a second electrode 43b32 inclined in the Y' direction are sequentially arranged.

Note that, as illustrated in FIG. 17, in the first electrode member 42, the first electrode 42b5 and the first electrode 42b6 are connected with the first lead-out wiring line 42c at one end on the side of the long side including the tongue piece portion 4B. Furthermore, the first lead-out wiring line 42c is branched and finally led to the end portion of the tongue piece portion 4B.

On the other hand, as illustrated in FIG. 18, in the second electrode member 43, the second electrodes 43b9 to 43b32 inclined with respect to the X-Y direction are each connected to the second lead-out wiring line 43c that extends parallel to the long side of the second substrate 43a. The other ends of the second lead-out wiring lines 43c, which are the side opposite to the ends connected to the second electrodes 43b9 to 43b32, are led on the surface not opposed to the elastic member 41 of the second substrate 43a via through holes (not illustrated) provided in portions indicated by black circles in the drawing.

As illustrated in FIG. 19, the second lead-out wiring lines 43c are shorted in the surface not opposed to the elastic member 41 of the second substrate 43a, aggregated into four, and led to the end portion of the tongue piece portion 4B.

Specifically, the second electrodes 43b11, 43b15, 43b19, 43b21, 43b25, 43b29 on the left side (defined in the left and right when viewing the drawing in plan view) inclined in the X' direction are shorted. Furthermore, the second electrodes 43b12, 43b16, 43b20, 43b22, 43b26, 43b30 on the right side inclined in the X' direction are shorted.

On the other hand, the second electrodes 43b9, 43b13, 43b17, 43b23, 43b27, 43b31 on the left side inclined in the Y' direction are shorted. Furthermore, the second electrodes 43b10, 43b14, 43b18, 43b24, 43b28, 43b32 on the right side inclined in the Y' direction are shorted.

Note that in this example, since two of the aggregated second lead-out wiring lines 43c intersect with the other two, the intersecting portions go through the opposed surface to the elastic member 41 of the second substrate 43a via through holes (not illustrated) (see FIGS. 18 and 19).

The other points of this embodiment are similar to the second embodiment described above.

According to the present embodiment, by simply providing the first electrodes 42b and the second electrodes 43b on only the two opposed sides, the three component forces (the forces in the X direction, the Y direction, and the Z direction) with respect to the cover panel 2 can be detected. The present embodiment is suitable for, for example, a smartphone because of the narrow frame edges of two sides.

Note that the shear force detected in the present embodiment is a force $(F_{x'}, F_{y'})$ in the X' direction and the Y' direction inclined by 45°, but as shown in Formula 3 below, they can be converted into $F_x$ and $F_y$.

$$\begin{pmatrix} F_x \\ F_y \end{pmatrix} = \begin{pmatrix} \cos 45° & -\sin 45° \\ \sin 45° & \cos 45° \end{pmatrix} \begin{pmatrix} F_{x'} \\ F_{y'} \end{pmatrix} \qquad \text{Formula 3}$$

Note that in the present invention, it is sufficient to simply provide the electrodes on one side (not illustrated), but in the present embodiment, the electrodes are further provided on the opposed side, thereby ensuring further accurately detecting the shear force. For example, in a case where a shear input is performed by a finger at one point of an end in an operating surface of the cover panel 2, the cover panel 2 rotates and moves around an axis perpendicular to the plate surface, and a detection error occurs in the case of the electrodes on only one side. In contrast, when the electrodes are present on the opposed sides, the detection error can be canceled.

Fourth Embodiment

It may be configured that, not only the shear force, but a force (moment) of rotating the cover panel 2 can be detected from the shearing force.

Figure 20:
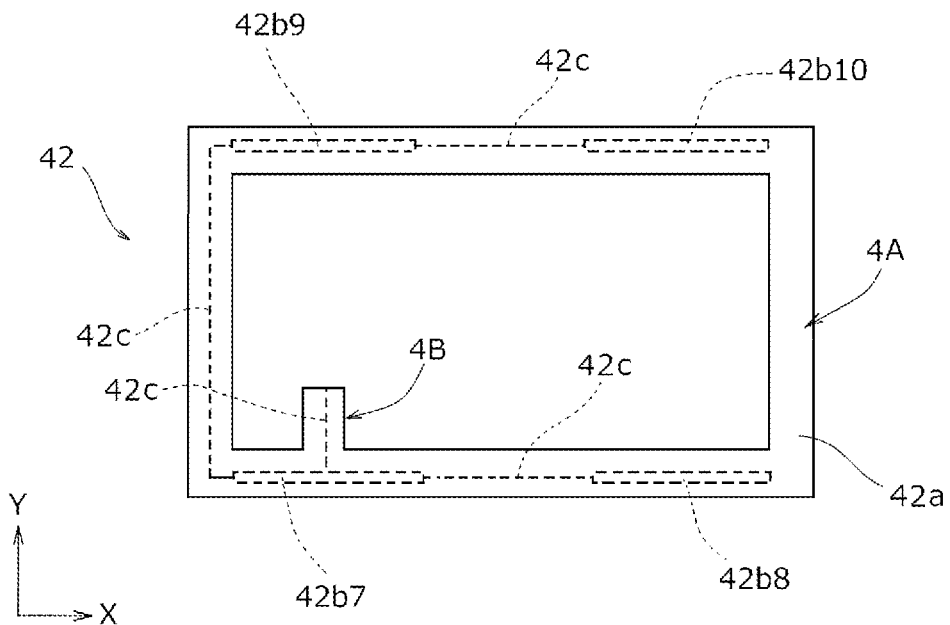
FIG. 20 is a plan view illustrating a first electrode member of a shear force sensor according to a fourth embodiment.
Figure 21:
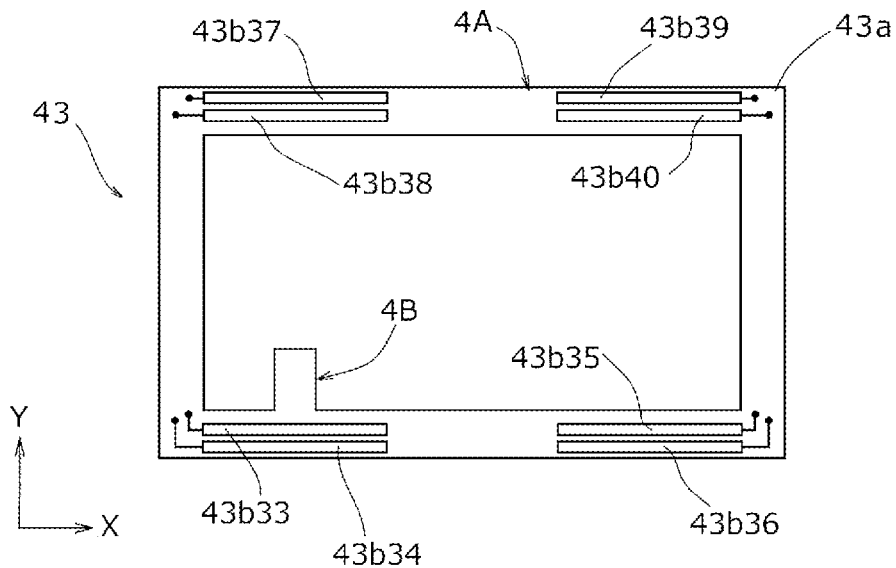
FIG. 21 is a plan view illustrating a second electrode member of the shear force sensor according to the fourth embodiment.
Figure 22:
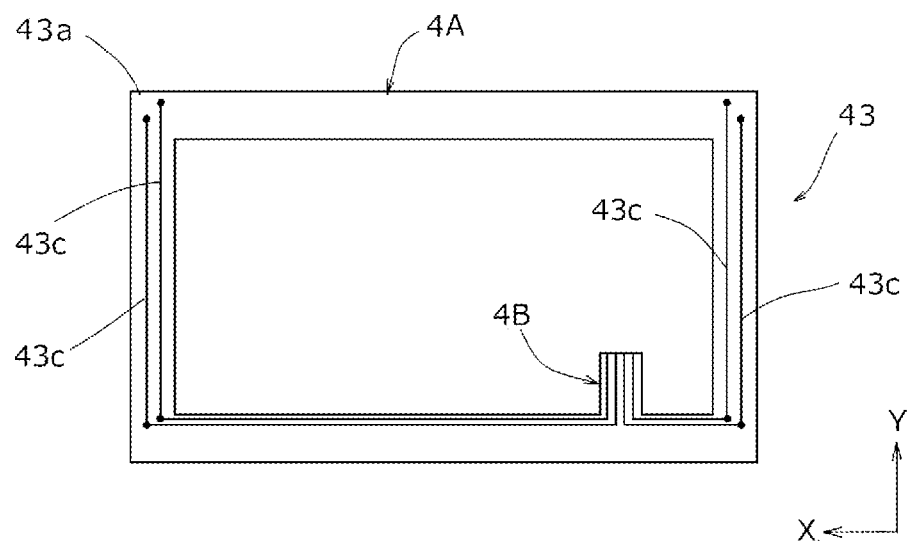
FIG. 22 is a rear view illustrating the second electrode member of the shear force sensor according to the fourth embodiment.

FIG. 20 is a plan view illustrating a first electrode member of a shear force sensor according to a fourth embodiment. FIG. 21 is a plan view illustrating a second electrode member of the shear force sensor according to the fourth embodiment. FIG. 22 is a rear view illustrating the second electrode member of the shear force sensor according to the fourth embodiment.

In the present embodiment, as illustrated in FIG. 20, one band-like first electrode 42b is disposed on both sides excluding the central portion of the long side of the opposed surface to the elastic member 41 of the first substrate 42a. Specifically, a first electrode 42b7 is on the lower left, a first electrode 42b8 is on the lower right, a first electrode 42b9 is on the upper left, and a first electrode 42b10 is on the upper right in plan view of the drawing.

Additionally, as illustrated in FIG. 21, one set of a pair of the second electrodes 43b and 43b are disposed on both ends of the long side of the opposed surface to the elastic member 41 of the second substrate 43a. Specifically, a set of a second electrode 43b33 and a second electrode 43b34 are on the lower left, a set of a second electrode 43b35 and a second electrode 43b36 on the lower right, a set of a second electrode 43b37 and a second electrode 43b38 are on the upper left, and a set of a second electrode 43b39 and a second electrode 43b40 are on the upper right in plan view of the drawing.

In the first electrode member 42, as illustrated in FIG. 20, between the first electrode 42b7 and the first electrode 42b8, between the first electrode 42b7 and the first electrode 42b9, and between the first electrode 42b9 and the first electrode 42b10 are connected with the first lead-out wiring line 42c. Further, the first lead-out wiring line 42c is led from the first electrode 42b7 near the tongue piece portion 4B to the end portion of the tongue piece portion 4B.

On the other hand, as illustrated in FIG. 21, in the second electrode member 43, the second lead-out wiring lines 43c are connected to one end on the short sides of the respective second electrodes 43b33 to 40 of the second substrate 43a. The other ends of the second lead-out wiring lines 43c, which are the side opposite to the ends connected to the second electrodes 43b33 to 40, are led in the surface not opposed to the elastic member 41 of the second substrate 43a via through holes (not illustrated) provided in portions indicated by black circles in the drawing.

As illustrated in FIG. 22, the second lead-out wiring lines 43c are shorted in the surface not opposed to the elastic member 41 of the second substrate 43a, aggregated into four, and led to the end portion of the tongue piece portion 4B.

Specifically, the second electrode 43b33 and the second electrode 43b38, the second electrode 43b34 and the second electrode 43b37, the second electrode 43b35 and the second electrode 43b40, and the second electrode 43b36 and the second electrode 43b39 are shorted.

The other points of this embodiment are similar to the second embodiment described above.

According to the present embodiment, not only the shear force, but a force (moment) of rotating the cover panel 2 can be detected from the shearing force.

When the first electrode 42b7, the first electrode 42b8, the first electrode 42b9, and the first electrode 42b10 are defined as a detection electrode 1, a detection electrode 2, a detection electrode 3, and a detection, respectively, in a case where a capacitance between the detection electrode 1 and a detection electrode k (k is an integer from 1 to 4) is defined as $C_k$, each force with respect to the cover panel 2 ($F_y$: shear force in the Y direction, $F_z$: force in the Z direction, $M_y$: moment about an axis parallel to the Y-axis passing through the center of the upper surface of the cover panel, $M_z$: moment about an axis parallel to the Z-axis passing through the center of the upper surface of the cover panel) is expressed as in the following Formula 4 when, for example, the shape of the cover panel and the arrangement of the detection electrodes are point symmetry.

$$F_y \propto \left(\frac{C_1}{C_1+C_2} - \frac{C_1^0}{C_1^0+C_2^0}\right) + \left(\frac{C_4}{C_3+C_4} - \frac{C_3^0}{C_3^0+C_4^0}\right) \quad \text{Formula 4}$$

$$F_z \propto \left(\frac{C_1+C_2}{C_1^0+C_2^0} - 1\right) + \left(\frac{C_3+C_4}{C_3^0+C_4^0} - 1\right)$$

$$M_y \propto \left(\frac{C_1+C_2}{C_1^0+C_2^0} - 1\right) - \left(\frac{C_3+C_3}{C_3^0+C_4^0} - 1\right)$$

$$M_z \propto \left(\frac{C_1}{C_1+C_2} - \frac{C_1^0}{C_1^0+C_2^0}\right) - \left(\frac{C_4}{C_3+C_4} - \frac{C_3^0}{C_3^0+C_4^0}\right)$$

However, when the shape of the cover panel and the arrangement of the detection electrodes are not point symmetry, a correction term is appropriately put in these Formulae.

OTHER EMBODIMENTS (1) In each of the embodiments described above, an example (see FIG. 2) in which the shear force sensor 4 is mounted on the housing 3 including the frame-shaped side wall portion 3C that stands up from the support portion 3B so as to surround the end surface of the cover panel 2 has been described, but the information input device 1 of the present invention the information input device 1 of the present invention is not limited thereto.

Figure 23:
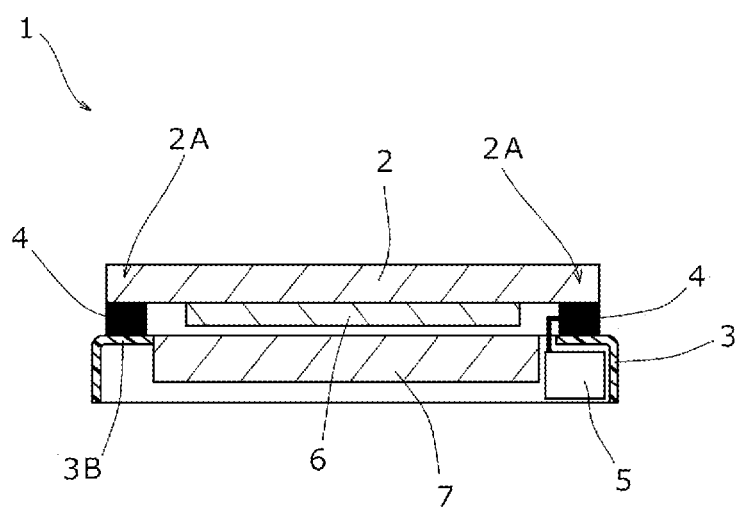
FIG. 23 is a cross-sectional view illustrating another example of a mounting state of the shear force sensor on a housing.

For example, as illustrated in FIG. 23, the side wall portion 3C may be eliminated from the housing 3. However, the housing 3 provided with the side wall portion 3C is more preferred. This is because when the end surface of the cover panel 2 is exposed, the finger is injured when the finger touches the end surface of the cover panel 2, and the cover panel 2 is likely to crack when the information input device 1 is dropped.

(2) In each of the embodiments described above, the outer perimeter of the shear force sensor 4 is matched with the dimension of the housing portion 3A of the housing 3 in consideration of the deformation in the horizontal direction of the elastic member 41. In other words, in a situation where a force is not applied to the shear force sensor 4, a clearance of 0.1 mm or more where nothing is present always exists between the end surfaces at the four sides of the cover panel 2 and the side wall portion 3C of the housing 3. The lower the hardness of the elastic member 41 of the shear force sensor 4 is, or the thicker the thickness is, the larger the movement of the cover panel 2 is, thus increasing the clearance. However, the information input device 1 of the present invention is not limited to this.

Figure 24:
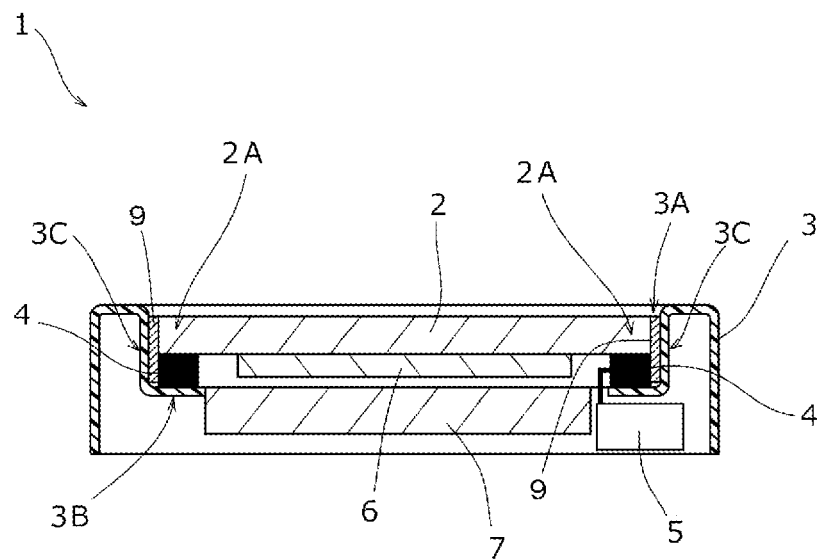
FIG. 24 is a cross-sectional view illustrating another example of a mounting state of the shear force sensor on the housing.

For example, as illustrated in FIG. 24, a shock-absorbing member 9 may be provided in this clearance. In a case where a clearance having a sufficient dimension is formed such that the end surface of the cover panel 2 is not damaged by contact with the side wall portion 3C of the housing 3 when the elastic member 41 deforms in the horizontal direction, for example, dust accumulates in the clearance, possibly damaging the appearance. Therefore, providing the shock-absorbing member 9 in the clearance allows minimizing the dimension of the clearance. Note that when a force is not applied on the shear force sensor 4, the shock-absorbing member 9 may be adhered to both of the end surface of the cover panel 2 and the side wall portion 3C of the housing 3 or may be adhered to either one of them. Furthermore, even when the shock-absorbing member 9 is provided, the large clearance damages the appearance, and thus the clearance in which the shock-absorbing member 9 is provided is preferably 0.5 mm or less.

As the material of the shock-absorbing member 9, similarly to the elastic member 41 of the shear force sensor 4, a material, such as various elastomers, such as a silicone elastomer and a urethane elastomer, and a gel-like body and a form thereof can be used.

Note that in FIG. 24, the shock-absorbing member 9 is not only in a clearance between the end surfaces at the four sides of the cover panel 2 and the side wall portion 3C of the housing 3, but also reaches the clearance between the end surface of the shear force sensor 4 and the side wall portion 3C of the housing 3. The shock-absorbing member 9 may be present only in the clearances between the end surfaces at the four sides of the cover panel 2 and the side wall portion 3C of the housing 3, but is more preferably also reaches the clearance between the end surface of the shear force sensor 4 and the side wall portion 3C of the housing 3. This is because the larger the area of the shock-absorbing member 9 is, the better the durability of the shock-absorbing member 9 against compression by the cover panel 2. Additionally, this allows easily disposing the shock-absorbing member 9 in the clearance.

Figure 25:
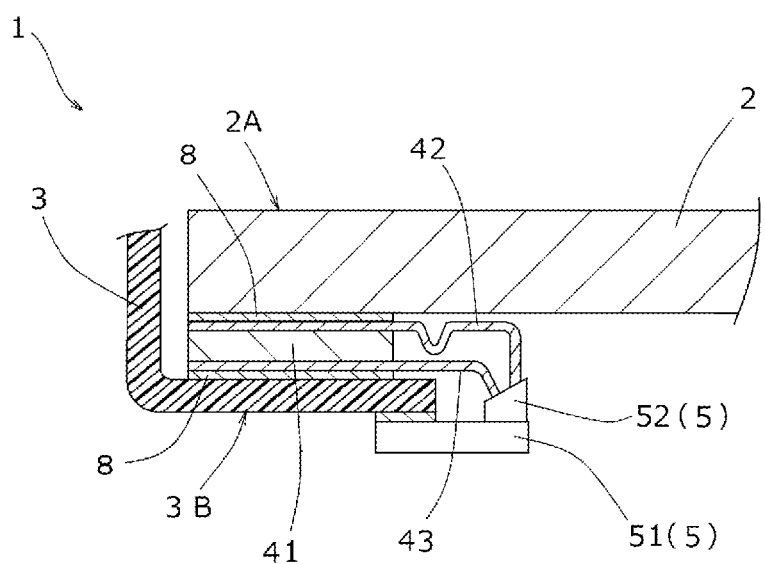
FIG. 25 is a diagram illustrating an example in which a tongue piece portion of the first electrode member is deflected and connected to a detection circuit.

(3) In each of the embodiments described above, fixing a substrate 51 of the detection circuit 5, such as a signal processing circuit, that processes an output signal from the shear force sensor 4 is not described in detail. In the information input device 1 of the present invention, when the substrate 51 of the detection circuit 5 is fixed to the side of the housing 3, as illustrated in FIG. 25, among the first electrode member 42 and the second electrode member 43, the tongue piece portion 4B of the electrode member located on the side of the cover panel 2 is preferably deflected, and the distal end of the tongue piece portion 4B is preferably inserted into the connector 52 provided on the substrate 51 of the detection circuit 5.

This is because when a force is applied to the shear force sensor 4 and the elastic member 41 deforms in the horizontal direction, the first electrode member 42 and the second electrode member 43 need to be displaced. In other words, when the substrate 51 of the detection circuit 5 is fixed to the side of the housing 3, the distance between a frame-shaped portion 4A of the first electrode member 42, which is the electrode member located on the side of the cover panel 2, and the connector 52 provided on the substrate 51 of the detection circuit 5 changes. Therefore, when the change in distance cannot be absorbed, the displacement of the first electrode member 42 is possibly hindered and the tongue piece portion 4B of the first electrode member 42 is possibly damaged.

In addition, instead of deflecting the tongue piece portion 4B of the first electrode member 42, a soft material, such as a urethane resin film, may be used for the first substrate 42a of the first electrode member 42.

Figure 26:
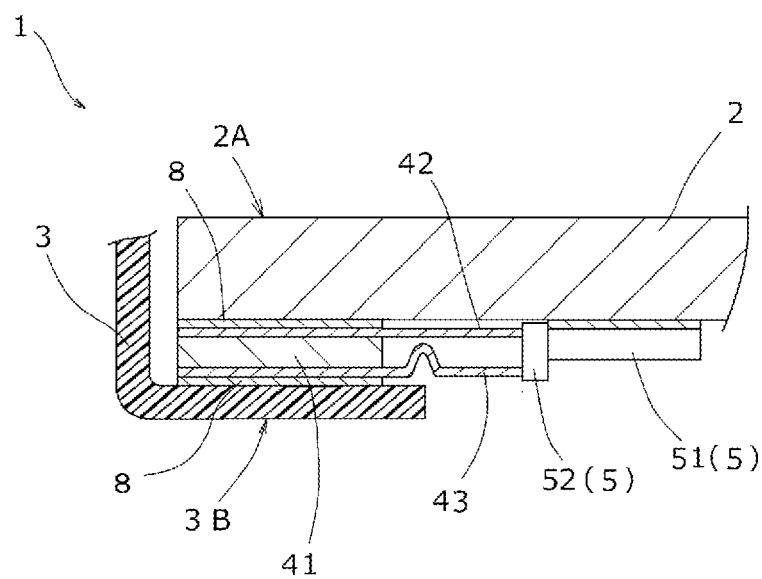
FIG. 26 is a diagram illustrating an example in which a tongue piece portion of the second electrode member is deflected and connected to the detection circuit.

In contrast, in the information input device 1 of the present invention, when the substrate 51 of the detection circuit 5 is fixed to the side of the cover panel 2, as illustrated in FIG. 26, among the first electrode member 42 and the second electrode member 43, the tongue piece portion 4B of the electrode member located on the side of the housing 3 is preferably deflected, and the distal end of the tongue piece portion 4B is preferably inserted into the connector 52 provided on the substrate 51 of the detection circuit 5.

In addition, instead of deflecting the tongue piece portion 4B of the second electrode member 43, which is the electrode member located on the side of the housing 3, a soft material, such as a urethane resin film, may be used for the second substrate 43a of the second electrode member 43.

(4) In addition, in the information input device 1 of the present invention, at least a coefficient of friction of a first region on which a shear force input is performed on the operating surface of the cover panel 2 may be larger than a coefficient of friction of a second region excluding the first region.

In general, a surface treatment is performed on the operating surface made of a glass sheet of the cover panel 2, such as a smartphone, with a fluorine-based coating agent to improve a slip of a finger. By increasing the coefficient of friction of the first region on which the shear force input is performed of the operating surface as in the range described above, the input by shear force becomes further easy. In addition, the coefficient of friction of the operating surface may be increased beyond the first region on which the shear force input is performed, for example, increased to the whole surface.

For example, it is possible to increase the coefficient of friction of the operating surface by not performing surface treatment with the coating agent. Furthermore, the coefficient of friction of the operating surface can be increased by sticking a sheet having a high coefficient of friction, such as a rubber, an elastomer, and a resin film, to the cover panel 2. Additionally, in addition to using imprint, photolithography, and printing, fine unevenness processing, such as sticking a molded article with fine unevenness surface generated by cast molding or injection molding, is performed on the cover panel 2, thus allowing the increase in coefficient of friction of the operating surface. Additionally, the coefficient of friction can be increased by forming a projection or a depression in the cover panel 2. Note that the projection can be any shape, such as a button shape or a line shape.

Figures 27A, 27B:
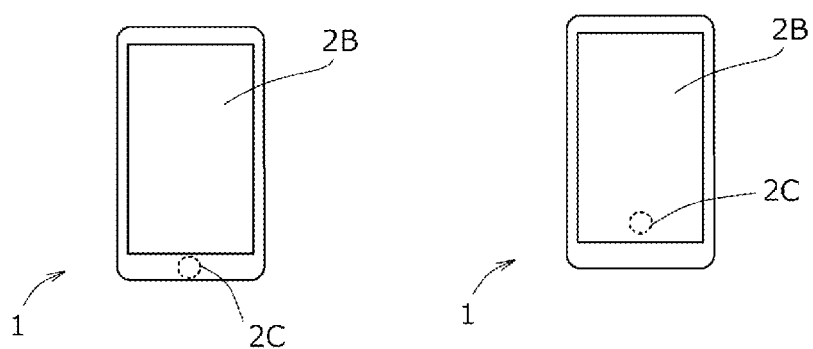
FIGS. 27(*a*) and (*b*) are diagrams is a diagram illustrating an example of a region having a large coefficient of friction in the cover panel.

FIGS. 27(a) and (b) are diagrams illustrating an example of a first region having a large coefficient of friction in the cover panel. In FIG. 27(a), a first region 2C having a large coefficient of friction is provided outside a display region of the cover panel 2. In FIG. 27(b), the first region 2C having a large coefficient of friction is provided inside a display region 2B of the cover panel 2. In the example illustrated in FIG. 27(b) described above, since the display quality is possibly interfered, the sheet, such as the rubber described above, may be removable except when the input by shear force is performed.

Figure 30:
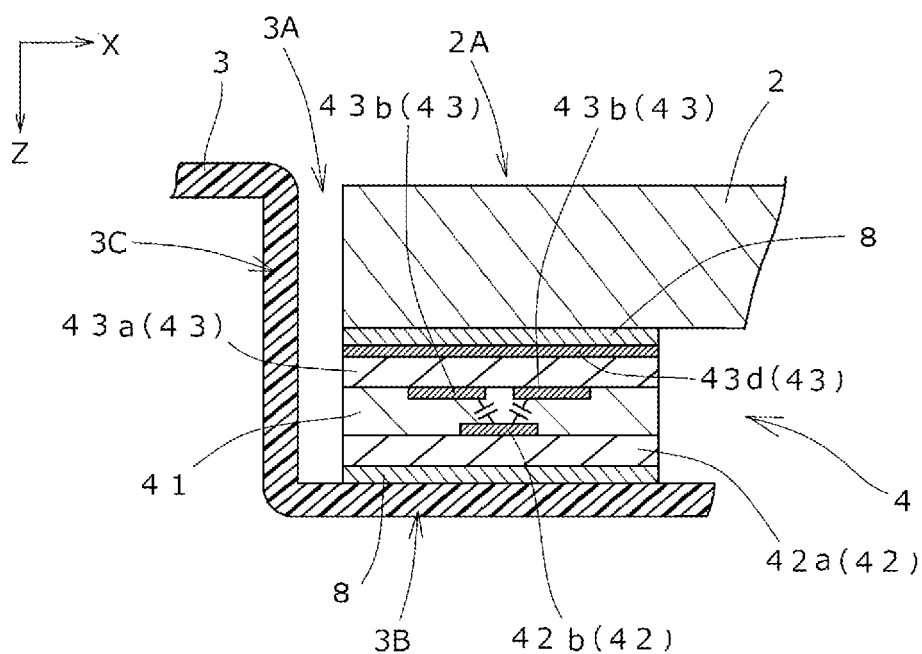
FIG. 30 is an enlarged view in the vicinity of another shear force sensor.

(5) In each of the embodiments described above, the shear force sensor 4 has the structure layered in the order of the first electrode member 42, the elastic member 41, and the second electrode member 43 from the side of the cover panel 2. However, as illustrated in FIG. 30, the layer arrangement of the first electrode member 42 and the second electrode member 43 may be switched. That is, the shear force sensor 4 may have a structure layered in the order of the second electrode member 43, the elastic member 41, and the first electrode member 42 from the side of the cover panel 2.

Note that in the example illustrated in FIG. 30, the GND layer 42d is not provided on the first electrode member 42, and a GND layer 43d is provided on the second electrode member 43. More specifically, the GND layer 43d of the second electrode member 43 is disposed on the surface on the side opposite to the side of the elastic member 41 of the second substrate 43a.

In addition, in a case where the layer arrangement of the first electrode member 42 and the second electrode member 43 is switched in this manner, whether the tongue piece portion 4B of any of the first electrode member 42 and the second electrode member 43 is deflected is also changed in the above-described (3). The other points are similar to the respective embodiments described above.

(6) In each of the embodiments described above, the frame-shaped shear force sensor 4 has the rectangular shape including the long sides and the short sides, but the electrode arrangement may be switched between the short sides and the long sides. The shape may be a square with sides having the same length. In addition, the shape may be a polygon other than a rectangle (a generic term of a rectangle and a square in this description).

(7) In each of the embodiments described above, the first substrate 42a and the second substrate 43a include the tongue piece portions 4B projecting inward from the inner perimeters of the frame portions 4A, but may be formed of only the frame portions 4A without the tongue piece portions 4B. In this case, a flexible printed circuit (FPC) is mounted separately.

(8) In each of the embodiments described above, the capacitive touch sensor 6 is attached to the back surface center of the cover panel 2 to provide the touch input function to the cover panel 2, but the capacitive touch sensor 6 need not be provided. The cover panel 2 need not impart the touch input function itself Calibration In the information input device 1 of the present invention, the resin described above is used for the material of the elastic member 41, but when an excessive force is applied, the elastic member 41 cannot be restored to the original shape even when the force is unloaded, which possibly results in a measurement error.

Therefore, as illustrated in FIG. 28, it is preferable that the problem of non-restoration of the shape of the elastic member 41 can be solved by performing calibration from information of presence/absence of a contact or proximity of an object to the operating surface of the cover panel 2 by the touch sensor 6 provided on the back surface of the cover panel 2.

Application Examples

The information input device of the present invention excellent in durability and visibility and configured to detect the shear force has been described above, and an example of applications achievable by the information input device 1 will be described below.

(1) For example, as illustrated in FIG. 29(a), for example, a smart phone or a mobile game machine is operated by touching the outside of the display region 2B by a thumb. At this time, a map app is displayed on a screen of a display 7. The screen is moved according to the forces of the shear forces $F_x$, $F_y$ applied to the cover panel 2 by the thumb, the screen is enlarged by a force of a pressing force $F_z$ applied to the cover panel 2 and reduced by double tap by the thumb, and thus the operations are performed. This allows the map app to be operated by only one-hand operation.

(2) As another example, as illustrated in FIG. 29(b), a circle symbol indicating a track point 10 is displayed on the display region 2B and touched for inputting a shear force.

(3) As another example, as illustrated in FIG. 29(c), a circle symbol indicating the track points 10 is displayed on the display region 2B, and these displays can be operated by the left and right thumb. The electrode structure of the shear force sensor 4 at this time detects a moment force from the shear force described in the fourth embodiment. On a racing game app, a magnitude of $M_x$ is set to be an angle of turning a steering wheel and magnitudes of $F_x$ are set to be an acceleration and a brake, thus ensuring providing intuitive game experience with good operability.

INDUSTRIAL APPLICABILITY

The information input device of the present invention is effectively used for electronic devices, such as a mobile phone, a smartphone, a PDA, a car navigation device, a digital camera, a digital video camera, a gaming device, and a tablet, and can be used to improve multi-function and operability of the electronic device.

REFERENCE CHARACTER LIST

1: Information input device
2: Cover panel
2A: Peripheral edge
2B: Display region
2C: Region with increased coefficient of friction
3: Housing
3A: Opening portion
3B: Support portion
3C: Side wall portion
4: Shear force sensor
4A: Frame portion
4B: Tongue piece portion
5: Detection circuit
6: Touch sensor
7: Display device
8: Adhesive member
9: Shock absorbing member
10: Track point
41: Elastic member
42: First electrode member
42a: First Substrate
42b, 42b1 to 10: First electrode
42c: First lead-out wiring line
42d: GND layer
43: Second electrode member
43a: Second substrate
43b, 43b1 to 40: Second electrode
43c: Second lead-out wiring line
43d: GND layer
46: Through hole
51: Substrate
52: Connector

The invention claimed is:

1. An information input device comprising:
a cover panel;
a housing including a support portion that supports a peripheral edge of the cover panel from a back surface;
a frame-shaped shear force sensor disposed between the peripheral edge of the cover panel and the support portion of the housing, the shear force sensor detecting a horizontal input with respect to a surface of the cover panel; and
a detection circuit connected to the shear force sensor, wherein
the frame-shaped shear force sensor has a structure in which a first electrode member, an elastic member, and a second electrode member are layered in this order from a side of the cover panel,
the first electrode member includes:
a first substrate having at least a frame portion;
a band-like first electrode disposed in a linear pattern on an opposed surface that is closest to the elastic member of the first substrate; and
a first lead-out wiring line provided on the first substrate and connected to the first electrode,
the second electrode member includes:
a second substrate having at least a frame portion;
a pair of band-like second electrodes disposed on an opposed surface that is closest to the elastic member of the second substrate so as to be in parallel to the first electrode and partially overlap with the first electrode in a plan view; and
a second lead-out wiring line disposed on the second substrate and connected to the second electrode, and
the elastic member covers all of the first electrode and the pair of second electrodes.

2. The information input device according to claim 1, wherein
the frame-shaped shear force sensor has a structure in which arrangements of the first electrode member and the second electrode member are switched and the first electrode member and the second electrode member are layered.

3. The information input device according to claim 1, wherein
each of the first substrate and the second substrate includes a tongue piece portion that protrudes inward from an inner perimeter of the frame portion, and
the first lead-out wiring line and the second lead-out wiring line are led to end portions of the tongue piece portions.

4. The information input device according to claim 3, wherein a substrate of the detection circuit is fixed to the side of the housing, and the tongue piece portion of the electrode member located on a side of the cover panel among the first electrode member and the second electrode member is deflected, and the tongue piece portion has a distal end inserted into a connector provided on the substrate of the detection circuit.

5. The information input device according to claim 3, wherein a substrate of the detection circuit is fixed to the side of the cover panel, and the tongue piece portion of the electrode member located on a side of the housing among the first electrode member and the second electrode member is deflected, and the tongue piece portion has a distal end inserted into a connector provided on the substrate of the detection circuit.

6. The information input device according to claim 1, wherein the cover panel has a rectangular shape.

7. The information input device according to claim 6, wherein the first electrode is disposed on at least one side in the frame portion of the first substrate so as to run along the side, and the pair of second electrodes are disposed on a side opposed to the side on which the first electrode is disposed of the first electrode in the frame portion of the second substrate so as to run along the side.

8. The information input device according to claim 7, wherein the first electrode is one of two first electrodes respectively disposed on two parallel sides in the frame portion of the first substrate so as to run along the respective side, and a set of the pair of second electrodes is disposed on each of two sides opposed to the two sides on which the two first electrodes are disposed of the first substrate in the frame portion of the second substrate so as to run along the respective side.

9. The information input device according to claim 7, wherein the first electrode is one of four first electrodes respectively disposed on four sides of the frame portion of the first substrate so as to run along the respective side, and a set of the pair of the second electrodes are disposed on each of four sides of the frame portion of the second substrate so as to run along the respective side.

10. The information input device according to claim 6, wherein the first electrode is disposed in a zigzag pattern formed from a plurality of linear portions on at least one side in the frame portion of the first substrate, the pair of second electrodes is one of a plurality of pairs of second electrodes disposed on a side opposed to the side on which the first electrode of the first substrate is disposed in the frame portion of the second substrate, and a number of the pairs of second electrodes corresponds to a number of the linear portions in the zigzag pattern of the first electrode.

11. The information input device according to claim 10, wherein the first electrode is one of two first electrodes respectively disposed in a zigzag pattern formed from a plurality of linear portions on one of two parallel sides in the frame portion of the first substrate, the pair of second electrodes is one of a plurality of pairs of second electrodes disposed on each of two sides opposed to the two sides on which the two first electrodes of the first substrate are disposed in the frame portion of the second substrate, and a number of the pairs of second electrodes corresponds to a total number of the linear portions in the zigzag patterns of the two first electrodes.

12. The information input device according to claim 7, wherein the first electrode is one of two pairs of first electrodes respectively disposed on both sides excluding a central portion of two parallel sides in the frame portion of the first substrate so as to run along the respective side, and the pair of second electrodes is one of two sets of pairs of second electrodes respectively disposed on two sides opposed to the two sides on which the two pairs of first electrodes of the first substrate are disposed in the frame portion of the second substrate so as to run along the respective side.

13. The information input device according to claim 1, wherein the housing includes a frame-shaped side wall portion, the side wall portion standing from the support portion so as to surround an end surface of the cover panel, and the shear force sensor and an outer edge of the cover panel maintain a distance from the side wall portion.

14. The information input device according to claim 13, comprising:

a shock-absorbing member provided between the end surface of the cover panel and the side wall portion of the housing.

15. The information input device according to claim 1, wherein at least a coefficient of friction of a first region on which a shear force input is performed in an operating surface of the cover panel is larger than a coefficient of friction of a second region excluding the first region.

16. The information input device according to claim 1, wherein a capacitive touch sensor is attached to a back surface center of the cover panel.

\* \* \* \* \*